US009355510B2

(12) United States Patent
Crigger et al.

(10) Patent No.: US 9,355,510 B2
(45) Date of Patent: *May 31, 2016

(54) BIOMETRIC ACCESS CONTROL SYSTEM

(71) Applicant: Law Enforcement Intelligent Devices, LLC, Auburn Hills, MI (US)

(72) Inventors: Rick Crigger, Fife Lake, MI (US); David G. Foster, Clarkston, MI (US); Sam Hoff, Clarkston, MI (US)

(73) Assignee: Law Enforcement Intelligent Devices, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,964

(22) Filed: Dec. 17, 2014

(65) Prior Publication Data

US 2015/0102901 A1     Apr. 16, 2015

Related U.S. Application Data

(60) Division of application No. 13/478,153, filed on May 23, 2012, now Pat. No. 8,947,201, which is a continuation of application No. 12/099,542, filed on Apr. 8, 2008, now Pat. No. 8,207,816, which is a continuation-in-part of application No. 11/183,473, filed on Jul. 18, 2005, now abandoned.

(51) Int. Cl.
*G07C 9/00* (2006.01)
*A47B 81/00* (2006.01)
(Continued)

(52) U.S. Cl.
CPC .......... *G07C 9/00079* (2013.01); *A47B 81/005* (2013.01); *E05B 73/00* (2013.01);
(Continued)

(58) Field of Classification Search
CPC .......... G07C 9/00158; G07C 9/00111; G07C 9/00079; G06K 9/00006
USPC ........................................................ 340/5.53
See application file for complete search history.

(56) References Cited

U.S. PATENT DOCUMENTS

| 4,467,545 A | 8/1984 | Shaw, Jr. |
| 5,022,536 A | 6/1991 | Pierson |

(Continued)

FOREIGN PATENT DOCUMENTS

| WO | WO 90/05965 A1 | 5/1990 |
| WO | WO 2005/013031 A2 | 2/2005 |

OTHER PUBLICATIONS

Intelligent Weapon Control System, Cass Technology Sdn Bhd, 2005, 5 pages.

(Continued)

*Primary Examiner* — Nabil Syed
(74) *Attorney, Agent, or Firm* — Reising Ethington P.C.

(57) ABSTRACT

A biometric access control system includes an equipment structure in communication with an identification station, which includes a processor, a user biometric reader, an equipment identification reader, a user interface to display categories of equipment authorized for use by a user and to receive input from the user including an indication to acquire or return the piece of equipment and a selection of an equipment category and a selection of a specific piece of equipment of the selected equipment category. The equipment structure includes storage locations for storing pieces of equipment assigned to the storage locations, and locks corresponding to the storage locations for individually securing the pieces of equipment to the structure, wherein an authorization signal from the identification station is receivable to release a lock containing the selected specific piece of equipment to permit removal of the selected specific piece of equipment.

20 Claims, 19 Drawing Sheets

(51) Int. Cl.
*E05B 73/00* (2006.01)
*G06K 9/00* (2006.01)

(52) U.S. Cl.
CPC ........ *G07C9/00111* (2013.01); *G07C 9/00158* (2013.01); *G06K 9/00006* (2013.01); *Y10T 70/7441* (2015.04)

(56) References Cited

U.S. PATENT DOCUMENTS

| | | |
|---|---|---|
| 5,245,329 A | 9/1993 | Gokcebay |
| 5,325,686 A | 7/1994 | Bentley |
| 5,701,770 A | 12/1997 | Cook et al. |
| 5,850,753 A | 12/1998 | Varma |
| 5,881,874 A | 3/1999 | McKinney |
| 5,916,087 A | 6/1999 | Owens |
| 5,952,924 A | 9/1999 | Evans et al. |
| 6,260,300 B1 | 7/2001 | Klebes et al. |
| 6,320,975 B1 | 11/2001 | Vieweg |
| 6,424,249 B1 | 7/2002 | Houvener |
| 6,510,642 B2 | 1/2003 | Riener |
| 6,588,635 B2 | 7/2003 | Vor Keller et al. |
| 6,678,984 B1 | 1/2004 | Rapp et al. |
| 6,684,548 B1 | 2/2004 | Petrus |
| 6,711,843 B2 | 3/2004 | Klebes |
| 6,806,807 B2 | 10/2004 | Cayne et al. |
| 6,836,556 B1 | 12/2004 | Bromba et al. |
| 7,113,071 B2 | 9/2006 | Cayne et al. |
| 7,243,024 B2 | 7/2007 | Endicott |
| 7,262,698 B1 | 8/2007 | Frederick et al. |
| 7,336,174 B1 | 2/2008 | Maloney |
| 2001/0033220 A1 | 10/2001 | Stone et al. |
| 2002/0021206 A1 | 2/2002 | Wootton et al. |
| 2002/0158095 A1 | 10/2002 | Vor Keller et al. |
| 2004/0113786 A1 | 6/2004 | Maloney |
| 2005/0082241 A1 | 4/2005 | Lane et al. |
| 2006/0048551 A1 | 3/2006 | Tanos |
| 2006/0255699 A1 | 11/2006 | Punzel et al. |
| 2007/0013478 A1 | 1/2007 | Crigger et al. |
| 2008/0186130 A1 | 8/2008 | Trevino et al. |

OTHER PUBLICATIONS

DSM—Law Enforcement Products Manual, Evidence Handling and Firearms Storage Systems, 16 pages.

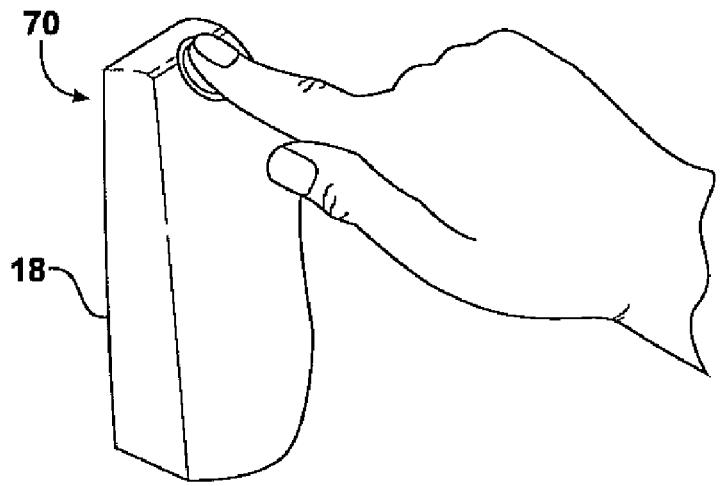
FIG - 10
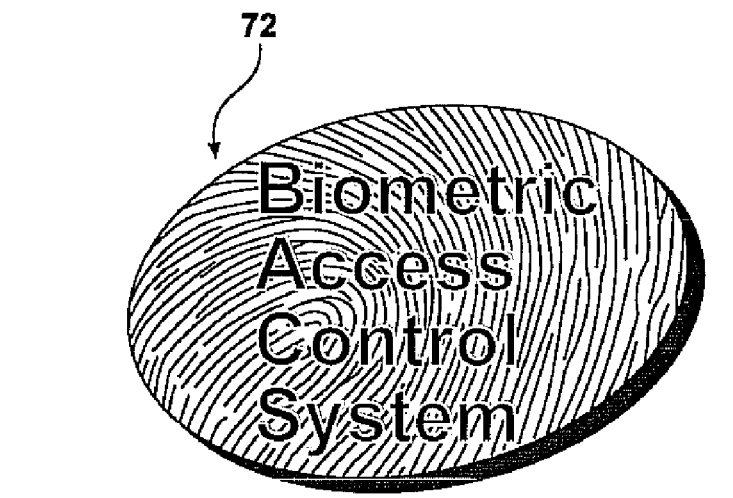
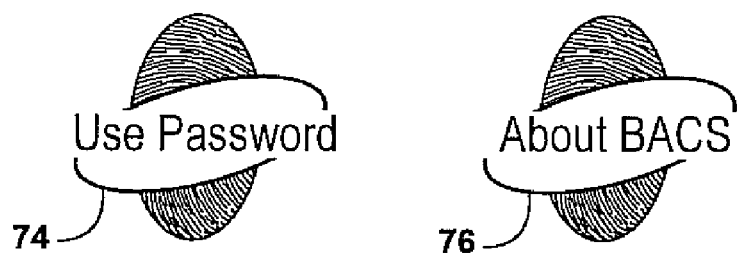
FIG - 11

FIG - 24

Identified:
Dave Malkan
Assign RFID tag to this equipment:

Category: Rack - Long Gun  —196
Equipment Name: M4 Carbine No 2
ID Tag: 45764563456
(Clear RFID) RFID Tag: R 0000 0000000141571414
Storage Location: (Main Set) (Auto Set)
　　　　　　　　　　　　—198　　—200

Choose Equip.　　Read RFID Tag　　Exit

Identified:
Default Administrator
Assign RFID tag to this equipment:

Category: PBT 01 Lifeloc
204　Equipment Name: PBT O1
202　　　　　　　ID Tag: FC104702CI
　　(Clear RFID) RFID Tag: R 0000 0000000129648572
(Clear Loc.)　Storage Location: Locker 60100003: 24

Identified:
Dave Malkan
Assign RFID tag to this equipment:

Choose Equip.　　Category: Locker - Side Arm
Equipment Name: Glock No 1
ID Tag: 567598577
(Clear RFID) RFID Tag: R 0000 0000000138104815
206　(Clear Loc.)　Storage Location: Dynamic Choose Equip.　　Read RFID Tag　　Exit

BIOMETRIC ACCESS CONTROL SYSTEM

BACKGROUND

The present disclosure relates generally to both wired and wireless related variants of weapon storage and access assemblies.

The prior art is well documented with various examples of weapon storage assemblies. A common objective of such assemblies is to provide for secure retention of items such as firearms and, if possible, to establish some means for selective release to individuals, such as law enforcement officers.

U.S. Pat. No. 6,806,807 to Cayne et al. teaches an electronic locking system for accessing one of a plurality of lockable storage enclosures. A biometric sensor is provided in communication with a storage enclosure locking/unlocking controller and for sensing one or more identifying characteristics of users, the controller being adapted to store the one or more identifying characteristics from the users in a memory and linking the stored identifying characteristics for the users with one of the lockable storage enclosures. Additional features include incorporating new identifying characteristics with a lockable storage enclosure and an associated intelligent lockable device with first and second sliding bolts for locking/unlocking first and second enclosed areas.

Related U.S. Pat. No. 7,113,071, also to Cayne et al., discloses a method of using an intelligent locking system for accessing one a plurality of lockers including programming the system by recording at least one biometric characteristic of a user, storing the recorded biometric characteristic in memory, and associating the biometric characteristic with one or more of the lockers so that the user is authorized to access the locker. Additional steps include locking the locker, re-recording the biometric characteristics of the user, after the re-recording step, comparing the re-recorded characteristics with those previously recorded, and unlocking the locker if the re-recorded biometric characteristic of the user matches the recorded characteristic. In this fashion, the system is newly reprogrammed for each subsequent use of the locker.

International Publication Number WO 2005/013031, to Cass Technology Sdn.Bhd, teaches a firearm security and access system consisting of a combined firearm repository and security access control system. A housing chamber defines an internal space for accommodating at least one firearm, as well as a means for holding the firearm securely within the housing chamber and a means for securely locking the firearm in the chamber. An alarm system associated with the system is triggered upon detection of an unauthorized access, as well as providing a means of identifying and verifying an authorized access to the firearm, and a means of recording all transactions relating to an authorized or an unauthorized access to the firearm held in the housing chamber of the firearm repository. Further improvements include means of tracking the whereabouts of the firearms and missing or stolen firearms.

Another example of the prior art is illustrated by the DSM Evidence Handling and Firearms Storage System brochure, DSM revised 02/03. Notable among the product descriptions in the DSM brochure are the Gun Storage Lockers, pages 9-10, as well as the system described in pages 5-6 and entitled "Audited Computer Controlled Evidence Storage System (A.C.C.E.S.S 500 Smart Locker)".

The Smart Locker design does not disclose use with any type of firearm, but teaches computerized tracking and monitoring of a plurality of lockers, based on multiple levels of security. Itemized features of the Smart Locker device also include access card, pin number, or both in order to deposit evidence, as well as denying operator to secured evidence.

U.S. Pat. No. 6,260,300, issued to Klebes, teaches a closable container for locking, storing, enabling and disabling a device such as a firearm. A control system is responsive to a biometric input, such as a fingerprint scanning device, in order to both unlock the container or a trigger lock apparatus, as well as operation and firing of an electronically controlled firearm.

U.S. Pat. No. 5,701,770, issued to Cook, teaches a gun safe with dual methods of gaining access. The safe exhibits a three-dimensional and rectangular shaped housing and includes a hingedly openable end face. A solenoid locking mechanism is situated within the interior space of the gun safe on the top face thereof. A fingerprint scanning mechanism is positioned within the interior space of the gun safe and is adapted to detect the placement of a fingerprint adjacent thereto for reading and digital processing. Memory is included within the interior space of the gun safe for storing a fingerprint of at least one predetermined authorized user in a digital format. Verification means are connecting to the locking mechanism in order to transmit an unlock signal to the locking mechanism upon the matching of a scanned fingerprint with at least one of the fingerprints stored in the memory.

Other references of note include Vor Keller, U.S. Pat. No. 6,588,635 and U.S. Patent Application Publication No. 2002/0158095, teaching a safety holster mechanism for preventing unauthorized access to a firearm by unauthorized users, and a safety housing for use therewith. Another reference of note is Riener, U.S. Pat. No. 6,510,642, which teaches a locking device (multi-compartment cabinet) operating in cooperation with an identification device for accomplishing wireless exchange of at least one unambiguous identification code.

A further class of references teaches biometric reading and authorization schemes, whether or not related to weapons storage/access. References of note include Houvener, U.S. Pat. No. 6,424,249; Bromba, U.S. Pat. No. 6,836,556; Evans, U.S. Pat. No. 5,952,924; and WO 90/05965, this calibrating a biometric scheme using a person's individual body odor as the identifying parameter.

Other references disclosed teach biometric control associated with a weapon itself, and rather than a storage/locking facility for weapons retention. These include Wootton, U.S. Patent Application Publication No. 2002/0021206; Rapp, U.S. Pat. No. 6,678,984; and Klebes, U.S. Pat. No. 6,711,843.

BRIEF SUMMARY

According to an implementation of a biometric access control system, an identification station includes a biometric reader to read biometric input from a user for recording the user's identity, an identification reader to read an identification of a piece of equipment to be acquired or returned by the user, a user interface to receive input from the user, including an indication to acquire or return the piece of equipment, and to display a plurality of categories of equipment authorized for use by the user, and to receive further input from the user including a selection of one of the equipment categories and a selection of a specific piece of equipment of the selected equipment category, and a processor in communication with the biometric reader, identification reader, and the user interface. The system additionally includes an equipment structure in communication with the identification station, and including a plurality of storage locations for storing a plurality of pieces of equipment assigned to the plurality of storage locations, and a plurality of locks corresponding to the plurality of storage locations for individually securing the plurality of pieces of equipment to the structure. An authorization signal from the identification station is receivable to release a lock of the plurality of locks containing the selected specific piece of equipment to permit removal of the selected specific piece of equipment.

According to another implementation of a biometric access control system, an identification station includes a biometric reader to read biometric input from a user for recording the user's identity, and an identification reader to read an identification of a piece of equipment to be returned or acquired by the user. A user interface receives input from the user including an indication to return or acquire the piece of equipment, an indication that a returned piece of equipment requires maintenance, and a reason for the required maintenance, and to display a plurality of categories of equipment authorized for use by the user, and to receive further input from the user including a selection of an equipment category and a selection of a specific piece of equipment of the selected equipment category that is not locked out from acquisition because the specific piece of equipment has been indicated as requiring maintenance. A processor is in communication with the biometric reader, identification reader, and the user interface, wherein the biometric reader, identification reader, and processor cooperate to enable logging of equipment acquisitions and returns and provide a history of equipment maintenance and usage. The system also includes an equipment structure in communication with the identification station, and including a plurality of storage locations for storing a plurality of pieces of equipment assigned to the plurality of storage locations, and a plurality of locks corresponding to the plurality of storage locations for individually securing the plurality of pieces of equipment to the structure. An authorization signal from the identification station is receivable to release a lock of the plurality of locks containing the selected specific piece of equipment to permit removal of the selected specific piece of equipment that is authorized for the user and not locked out from acquisition as requiring maintenance.

BRIEF DESCRIPTION OF THE DRAWINGS

Reference will now be made to the attached drawings, when read in combination with the following detailed description, wherein like reference numerals refer to like parts throughout the several views, and in which:

FIG. 10 is an illustration of a first user interface step associated with the ID station and allowing a user to input a biometric parameter (fingerprint) and in order to initiate a weapon acquisition/release log-in sequence;

FIG. 11 is a succeeding password entry screen which may follow the biometric input, and in order to provide an additional layer of user authentication;

FIG. 24 is a screen illustration of a radio frequency identification (RFID) tag for permitting a user to assign/clear/read an RFID tag located on the weapon to the system weapon record log;

DETAILED DESCRIPTION

Figure 2:
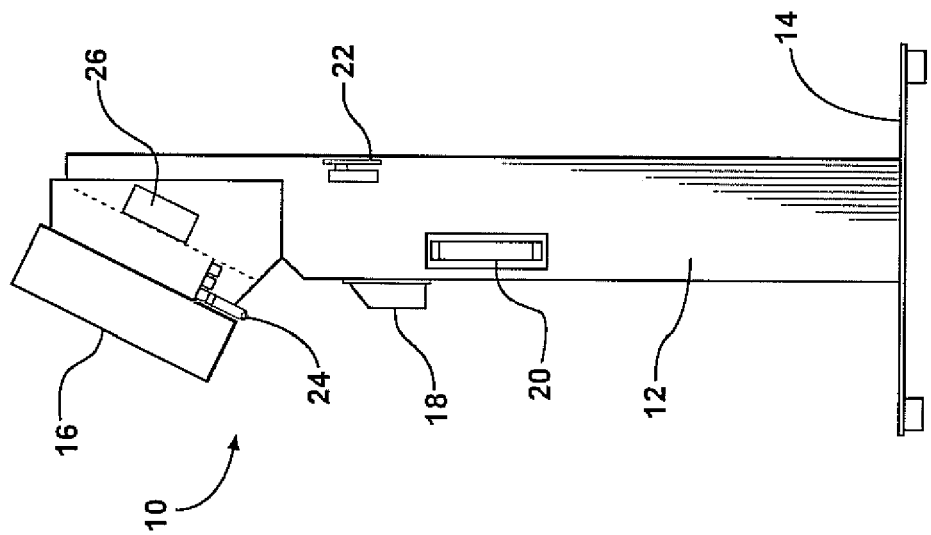
FIG. 2 is a side view of the ID station shown in FIG. 1.

Disclosed is an improved biometric access control system (BACS) which combines the features of a stand-alone ID station/touch screen kiosk, with a plurality of individual critical asset (e.g. weapon) supporting racks and/or cabinets, these being communicable in two way fashion via wired or wireless (Bluetooth) technology with the ID station and in order to authorize release and re-entry of such items. Additional RFID technology includes a scanner and reader associated with the ID station and, in cooperation with individual tags associated with each asset/piece of equipment, and in order to provide closed loop weapon tracking.

The ID station/kiosk incorporates a sophisticated user interface processor driven protocol which operates with a biometric input reader, as well as the RFID and wired or wireless (Bluetooth) technology, in order to provide user rated authorization and release of selected critical assets (weapons), maintenance tagging of selected items, and other database enterable/updatable logs for providing a history of weapon location and usage by selected individuals. Additional features include providing remote access interface with the system (such as for use by command or designated administrative personnel).

The individual rack and locker cabinets each represent a power enabling unit which includes a 120 V AC input and can hold a selected plurality of critical assets. In the case of the lockers typically a number of longer barreled weapons and in the further instance of the lockers such as stun (taser) guns, night vision equipment/goggles, portable breathalyzer devices, AED's, radios, and handguns.

Each of the rack and locker variants may also include sensor verification of devices stored therein. In the instance of the racks, photoelectric sensors, combined with LED identification elements associated with each asset locking location (e.g. clamp) establish verification of weapon presence.

The individual racks/lockers can be arranged in such as fashion that a single master rack or locker is arranged in wired or wireless (Bluetooth) fashion with a given ID station, with additional pluralities of either racks or lockers communicable in a wired or wireless fashion with the master rack/locker. In such a fashion, up to 72 locks can be operated from a single wired or wireless (Bluetooth) connection (through the assignment of dedicated node address) and a single ID station/kiosk can wirelessly transmit to over fifty (50) individual weapon racks/storage lockers.

A user specific emergency override associated with the user interface protocol, or optionally a bypass key, can be employed to access all non-maintenance tagged assets in an emergency situation. The present system is also scalable, and such that a plurality of kiosks (touch screen ID stations) can be employed and which provide simultaneous and overlapping access to all racks/lockers, this allowing application of any uniquely designed system to law enforcement or security departments of varying size, personnel, and equipment requirements.

Alternate variants also contemplate the provision of a two-way communicating wired version, in substitution of wireless/Bluetooth enabled embodiments. In such an alternate application, a master rack or locker is arranged in either of a wired or wireless fashion with a given ID station, with additional pluralities of either racks or lockers communicable in a wired only connection with the master.

Additional variants contemplate the incorporation of video cameras for recording user actions, such as from the time of biometric log in until the point of automatic or user-selected system logout. An associated and pre-recorded video footage can also be listed in the transaction history report for the logged activity, and such as further can be included as a clickable web link for viewing on a web page. Additionally, and when fingerprints (or other biometric enter-able information) is added or edited, a quality score is given indicating the potential requirement for re-teaching poor quality of recorded fingerprint images.

More specifically, the present disclosure discloses an improved weapon release assembly which combines the features of computerized rating and release/reentry of any number of weapons based upon individual biometric input parameters. Features include a standalone touch screen kiosk with built-in biometric reader, built-in RFID antenna and reader, Bluetooth network master and web server for remote connections, as well as alternate hard wired versions, and which communicates with any combination of racks and/or lockers for holding such as weapons and other critical assets. In combination with the above, a software driven processor provides inventory control for record keeping, including logout/reentry of weapons to and from the system, as well as automatic lockout of weapons not rated for a particular user, in combination with maintenance instructing protocol when a desired number of use iterations have occurred.

Referring now to the various illustrations, a biometric access control system (BACS) is illustrated according to a preferred embodiment of the present disclosure. As previously described, the present disclosure combines the features of a stand-alone ID station/touch screen kiosk with a plurality of individual critical asset (e.g. weapon) supporting racks and/or cabinets, these being communicable in two way fashion via a wired or wireless (Bluetooth) technology with the ID station and in order to authorize release and re-entry of such items. The control system further provides for more efficient and accurate recordkeeping of asset acquisition/return/maintenance identification and avoids the needs for manually generated paper logs. With further regard to the biometric user input requirement and the associated user interface manual, the ability to track and verify location and condition of a given asset is simplified, with the ability to generate reports and to allow for user/equipment setup to be securely accessed remotely from anywhere on the network by qualified personnel.

Figure 1:
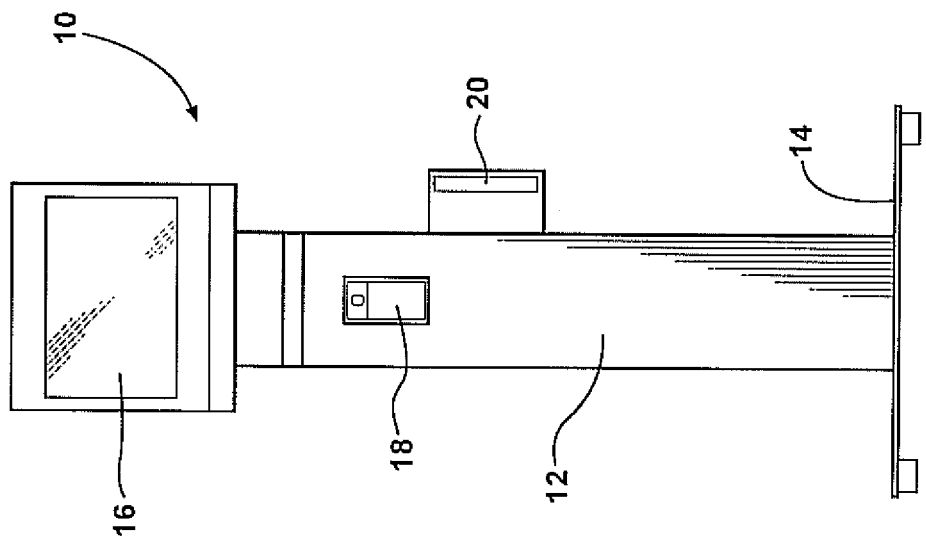
FIG. 1 is a front view of a touch screen PC based kiosk (ID station) for providing biometric assisted identification of an operator, RFID operated weapon log-in/log-out, and associated transactional summary according to the present disclosure.
Figure 3:
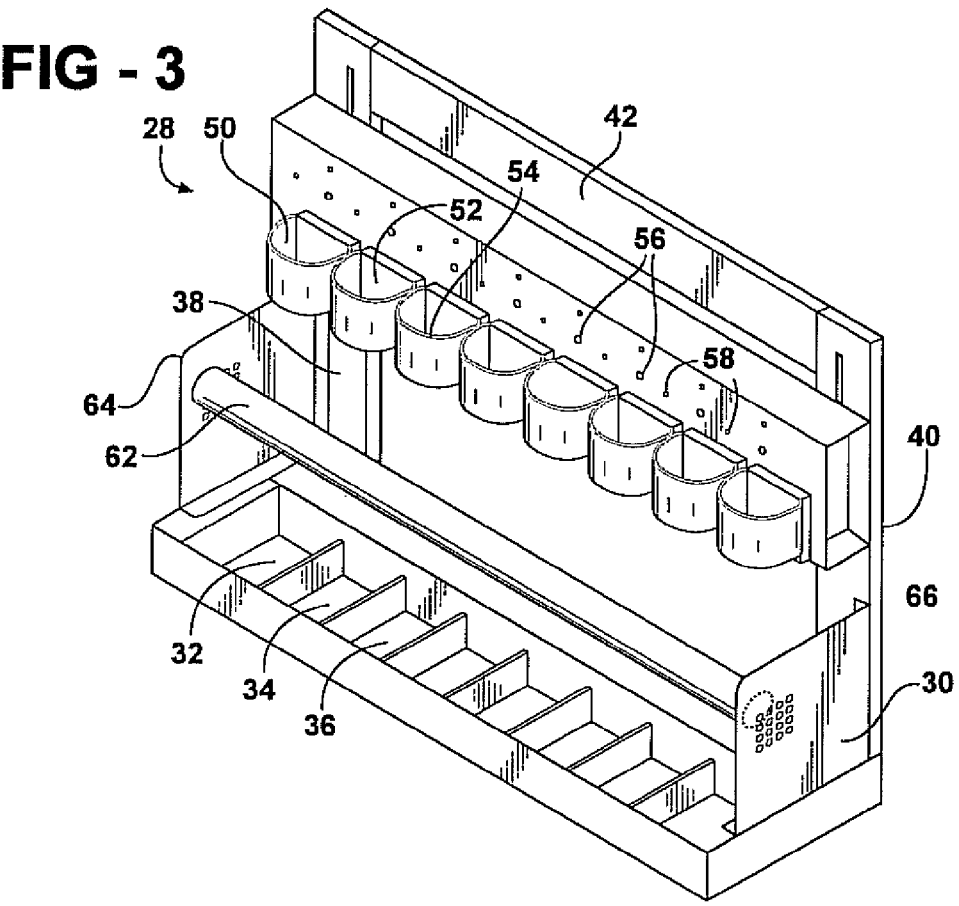
FIG. 3 is a perspective view of a weapons storage rack and such as which may be arranged in a master slave (wired) or secondary slaved/wireless remote (Bluetooth) communication with the ID station for selectively identifying/releasing/reentering a critical asset.
Figure 4:
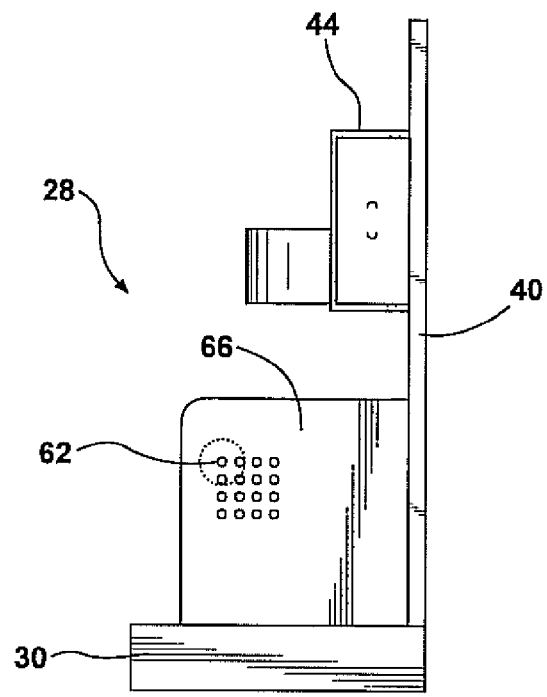
FIG. 4 is a side view of the weapons storage rack shown in FIG. 3.
Figure 5:
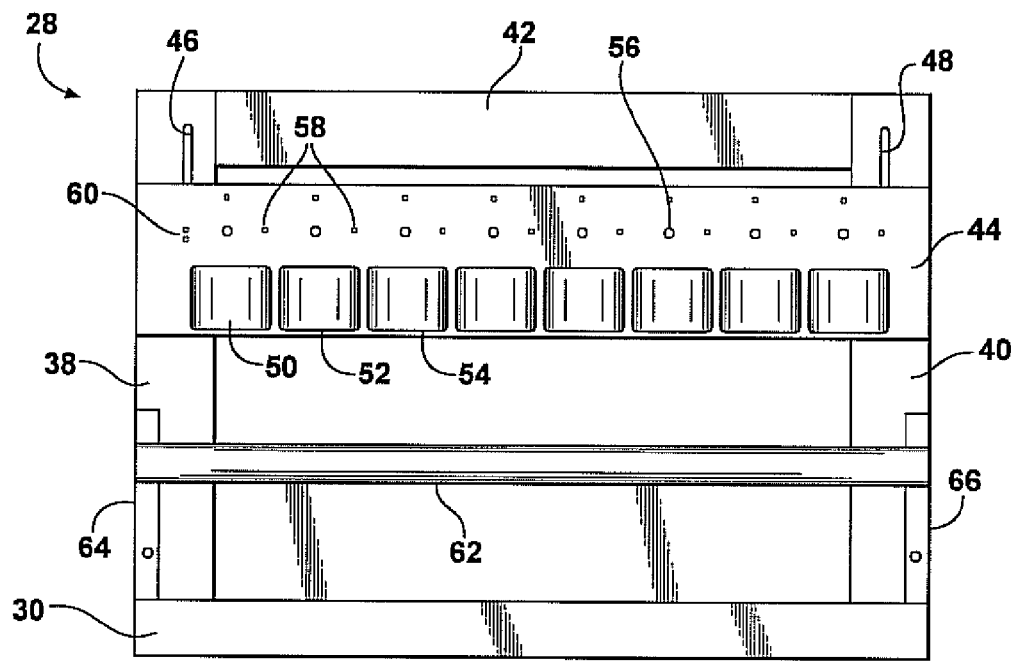
FIG. 5 is a front view of the weapons storage rack shown in FIG. 3 and illustrating such additional features as first/second contact locking locations, including individual engagement clamps, for individual and long barreled weapons, individual weapon sensors, and LED indicators for determining weapon status (present/absent)
Figure 6:
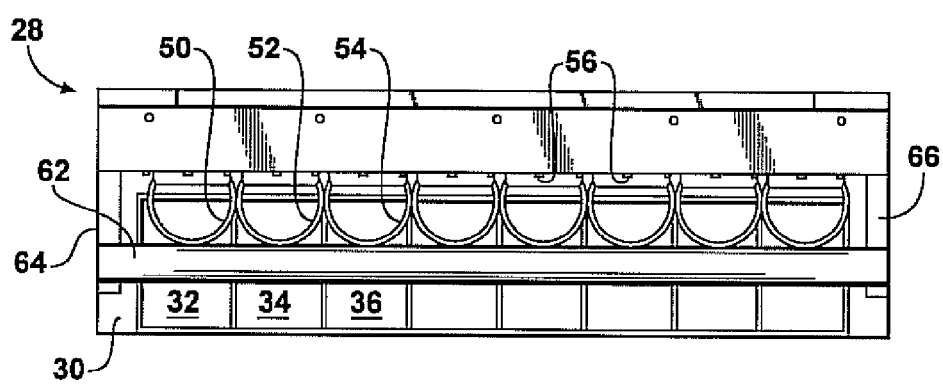
FIG. 6 is a top view of the weapons storage rack of FIG. 3.

Referring initially to FIGS. 1 and 2, respective front and side views are shown at 10 of a touch screen PC based kiosk (ID station) for providing biometric assisted identification of an operator (not shown), RFID operated weapon log-in/log-out, and associated transactional summary. The standalone kiosk 10 provides a single point of interface for multiple rails/lockers, as will be subsequently described, and for both acquiring and returning critical assets (e.g. weapons and related items). The kiosk 10 in the illustrated embodiment includes an upwardly extending body 12, including a pedestal base support 14, and which may be constructed from such as a durable metal and/or plastic material.

A PC supported and operated touch screen display, see at 16 in each of FIGS. 1 and 2, is mounted to an upper extending end of the body 12 and, in cooperation with the associated software modules as will be further described, operates to provide user interface with the system. Additional hardware features associated with the ID station 10 include a fingerprint scanner unit 18, an RFID (radio frequency identification) antenna 20, associated RFID board 22 (FIG. 2) and an optional wireless/Bluetooth antenna 24 (also FIG. 2). A power supply, such as 12 Vdc, see as representatively shown at 26 in FIG. 2, provides power for the PC and associated electronic components (biometric input, RFID reader, Bluetooth wireless connection).

As will be further described in additional detail in a discussion of the computer writeable medium for operating the features of the associated software modules, the overall system requirements include such as Windows® XP SP2, a visual basic developed user interface, and MSDE (SQL) database storage capacity, as well as secure web connection for both setup and reporting. As will be subsequently described in additional detail, the cooperating nature of the biometric input, REID antenna and reader, and software driven processor control interfaceable with the touch screen component of the ID station allows for a PC based operator interface kiosk to provide a single point of interface to multiple racks and lockers for acquiring and returning critical assets (weapons and other law enforcement related equipment). The biometric fingerprint aspect provides an identification point for designating and recording an operator's identity and, cooperating with the RFID chip or tag attached to the weapon which is scanned into the ID station reader, effectively tracks that asset within the system (acquisition, return, maintenance, etc.). The software and processor capabilities further provide for data warehousing (logging) of all transactions related to assets tracked by the system, and a web server provides for remote access to tracked equipment setup and transaction log reporting.

Referring collectively now to FIGS. 3-6, a series of perspective, side, front and top views are shown at 28 of a weapons storage rack, and such as which may be arranged in a wired or wireless master configuration with optional wired only slaves (and in the alternative to secondary slaved/wireless remote (Bluetooth) communication) communicating with the ID station 10 for selectively identifying/releasing/reentering a critical asset. As will be described later, the rack structure 28 can be complemented, or alternatively substituted, by any plurality of wired or wireless master lockers with optional wired only slave lockers, and for the purpose of selectively controlling access to critical assets. In the particular case of the rack constructions 28, longer barreled weapons, such as rifles, shotguns and the like are individually secured, whereas the lockers are provided for individually storing and securing such as stun guns, night vision goggles, portable breath analysis/test devices, AED's, radios and handguns.

Each of the racks 28 is constructed of a heavy duty frame (such as a welded eighteen gauge metal framework). A particular installation protocol causes each rack 28 to be secured to a wall and/or floor location (with additional identical/slaved units being secured such as in end-to-end fashion. As best shown in each of the perspective view of FIG. 3 and the front view of FIG. 5, includes a generally rectangular shaped and rugged body, e.g. typically steel or other suitable material, with a platform support bottom 30 recessed in a manner to define a number of individual weapon stock receiving and supporting pockets 32, 34, 36, et. seq. The pockets 32-36 typically include a plastic/rubber liner and in order to protect the weapons being stored.

An upwardly extending and generally rectangular shaped body integrally formed with the bottom 30 includes side members 38 and 40, and between which extend an upper cross member 42. Individualized weapon locking and retaining is provided by a first upper, crosswise extending and height adjustable and rectangular cross sectional shaped (rail section) support 44, which is mounted in vertically adjustable fashion relative to the side members 38 and 40, see vertical adjustment channels 46 and 48 in FIG. 5 which are defined in the sides 38 and 40. Although not clearly shown, security keyed bolts are provided for connecting the crosswise support 44 at a selected vertically adjusted location of the rack 28 and in order to deter disassembly of the rack 28 as a means for defeating the system.

Figure 7:
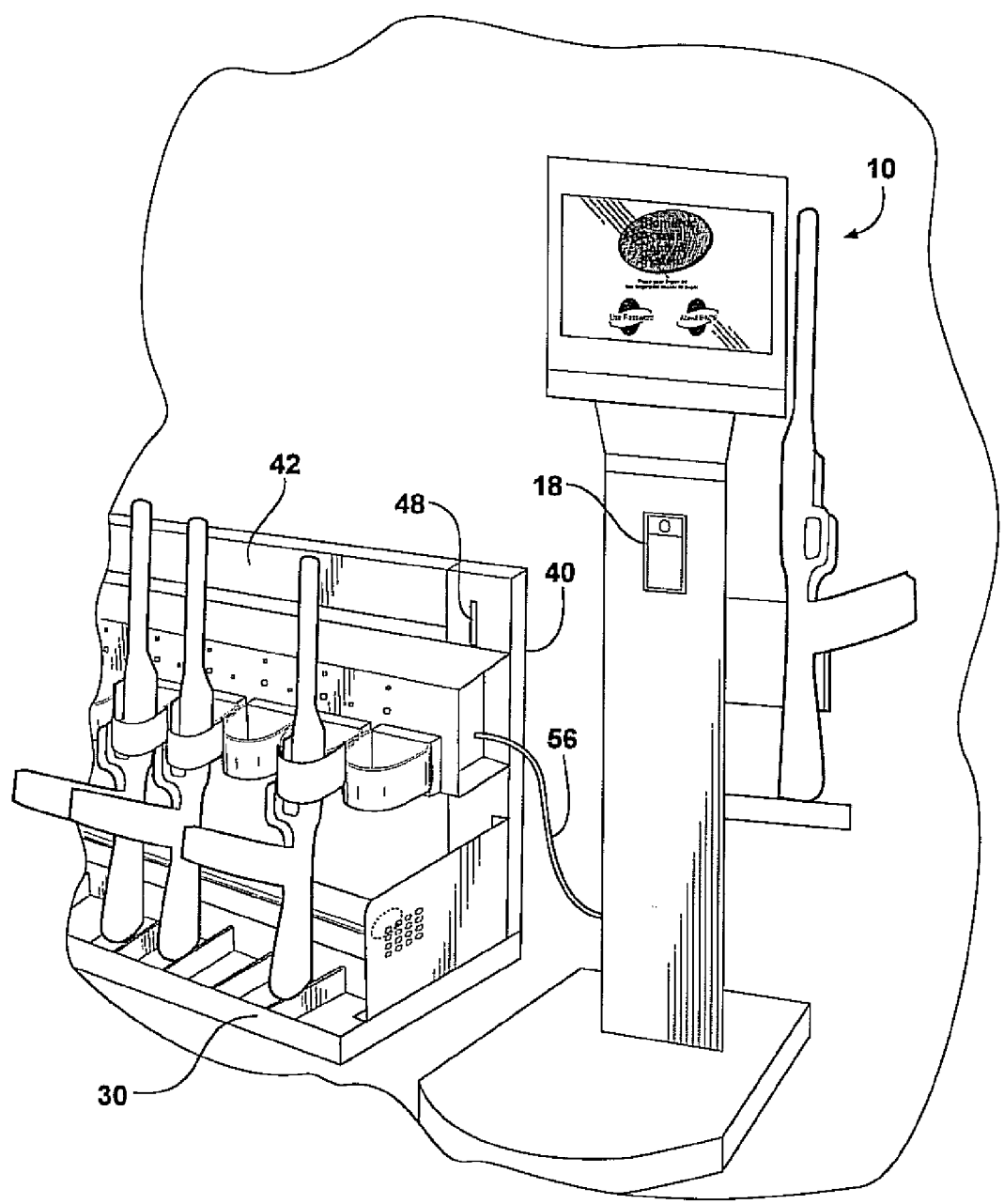
FIG. 7 is an illustration of the ID station in cooperation with a first weapons storage rack arranged in a wired/master slave relationship.

A plurality of individual clamp assemblies, see at 50, 52, 54, et. seq., are provided in spaced apart fashion, corresponding with the placement of the stock supporting pockets, 32, 34, 36, et. seq., each of which include a clamp-style grip for securing an individual weapon (see at 4, 6, 8, et. seq. in FIG. 7). The clamp assemblies 50, 52, 54 may include such as a powered magnetic locking construction or other known type and which may be individually actuated by the associated controls of the system for gripping a desired location of the weapon/asset and, as also described, an emergency override protocol built into the system, or alternatively an emergency release key, may be used to open all of the guns at the same time.

The rack 28 includes a 120V AC electrical power input communicated to the several individual power clamp assemblies 50, 52, 54, et. seq., such as through secure side access, and a plurality of photo-electric sensors 56 in operative slaved/wireless communication with the ID station 10 and being provided in aligned fashion with each powered clamp assembly in order to instruct the presence or absence of an asset assigned to a given locking location. Further pluralities of LED's include those shown at 58 (see again FIG. 5) for indicating a "lock open" condition for an assigned clamp assembly, as well as at 60 which indicate individual LED lights for power/communication and error indication. Also shown is an optional security bar 62 for engaging a weapon stock (see again FIG. 7) and which is mounted to planar shaped end members 64 and 66. In this fashion, the photoelectric sensors and LED's operate to 1) verify a weapon's presence in the system, 2) indicates a lock opened/closed condition, 3) indicate whether an error status has occurred; 4) to secure the weapon at two or more critical points and in order to prevent the occurrence of weapon removal by disassembly, and 5) adjust a given lock height in order to accommodate various long barrel weapons of varying types.

As described previously, either or both the racks 28 or associated lockers, can include a primary rack or locker which is connected via wired or wireless (Bluetooth) communication. In a first example, shown at 56 in FIG. 7 is the ID station 10 and which in turn communicates wired-only with a plurality of the slave racks. Alternatively, the ID station 10 can be wirelessly communicable utilizing Bluetooth technology, such as according to a three tier security verification with data encryption, with a plurality of individual and identically constructed slave racks. In this fashion, up to 72 locks can be operated from a single wired or wireless (Bluetooth) connection (through the assignment of individual addresses) and a single ID station/kiosk can wirelessly transmit up to fifty (50) individual weapon racks/storage lockers.

Figure 8:
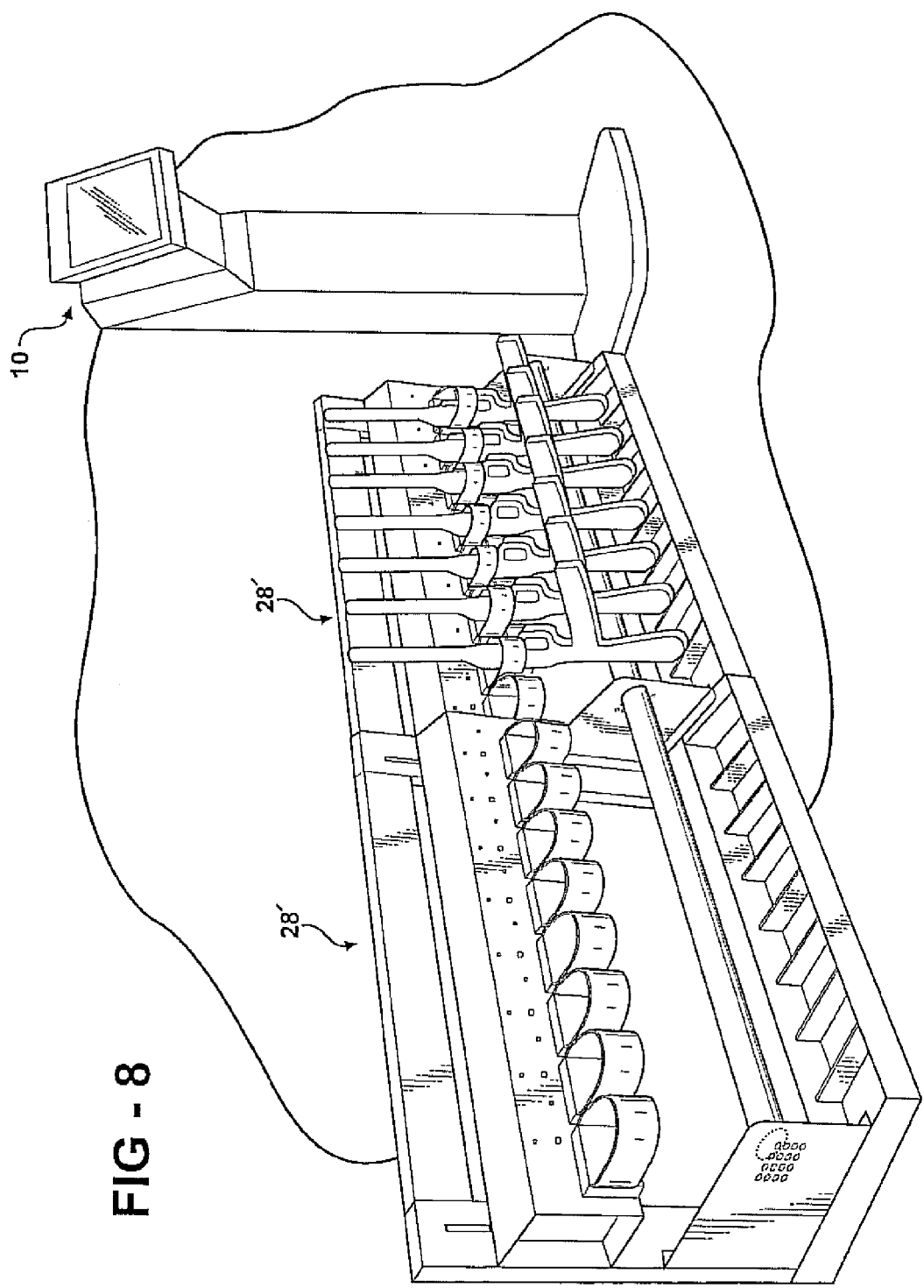
FIG. 8 is a succeeding illustration to that shown in FIG. 7 and further illustrating a plurality of racks arranged in wireless/slaved fashion.

Referring again to FIG. 7, as well as to FIG. 8, an illustration is shown of an ID station 10 in cooperation with a first weapons storage rack 28 arranged in a wired/master slave relationship, the rack 28 again holding a plurality (typically eight apiece) of long barreled weapons 4, 6 and 8. As also shown in FIG. 8, a plurality of racks 28' and 28" are mounted in side-by-side fashion and likewise arranged in wireless/slaved fashion with the primary rack 28, the primary rack 28 incorporating the necessary processor capabilities to communicate (transfer) the necessary information to the ID station 10.

Figure 9:
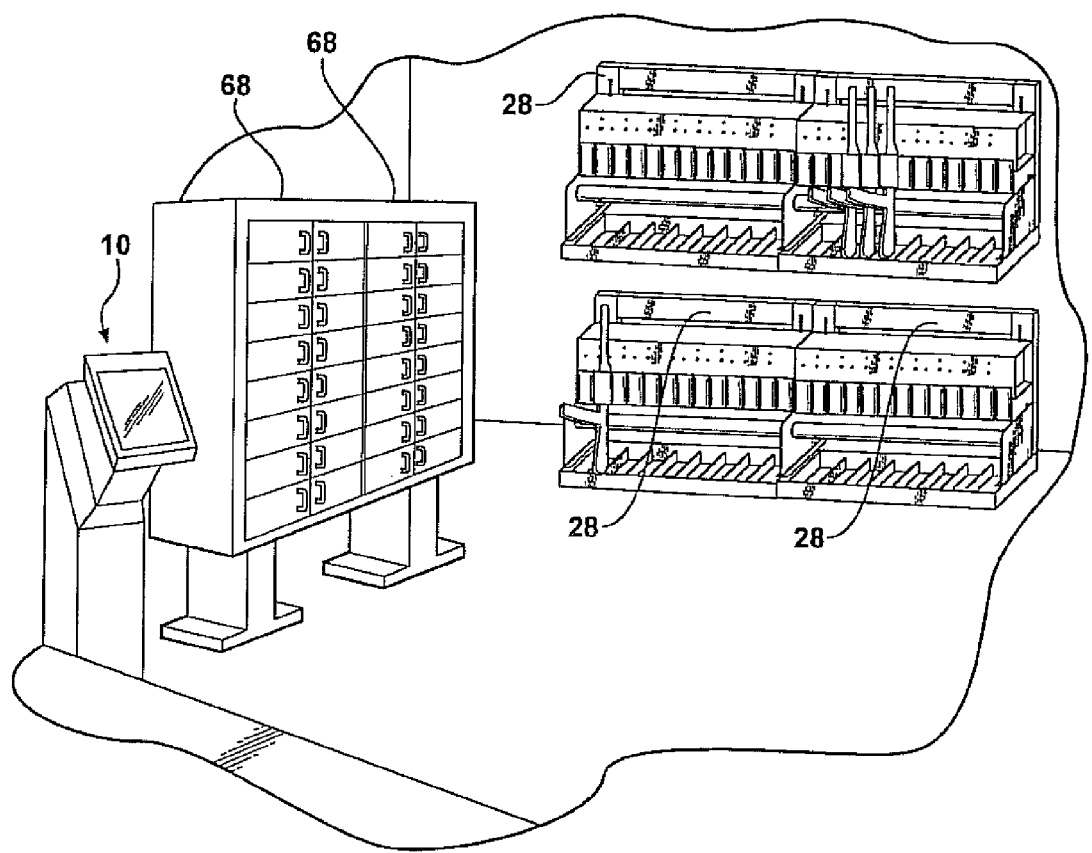
FIG. 9 is a yet further illustration of a first plurality of weapon retaining racks in cooperation with a further plurality of critical asset retaining lockers, both attached to a 120 volt input source and both further arranged in wireless and three tier security verification fashion with the ID station, and including data encryption means.

As further shown in FIG. 9, a first plurality of remote slaved weapon retaining racks 28 are secured to a far wall of a room enclosure within which the system is mounted, and in cooperation with a further plurality of critical asset retaining lockers 68, 68' and 68", are both attached to a 120 volt input source and both further arranged in wireless and three tier security verification fashion with the ID station, again shown at 10, and provided with data encryption capability. As described previously, the present system contemplates utilizing both lockers and racks in interchangeable fashion and it is further contemplated that one or more identically configured ID stations 10 are capable of over establishing synchronized processor control and interface capability with any number of racks 28 or lockers 68 and to thereby provide the system with scalability in order to satisfy the requirements of any small, medium or large sized law enforcement or security department. The scalability aspect of the system further enables a smaller system to be initially installed and, as the size and needs of the department grow, additional ID stations 10 and associated racks 28 and/or lockers 68 can be added without the need for replacing any of the original equipment.

Although not disclosed in the same detail as the racks 28, the lockers 68 (also termed smart CBU) are constructed as a multi-unit rugged steel construction with optional internal power receptacles located in each unit for providing low current device recharging (e.g. for such as tasers, breathalyzer devices, etc.). The lockers 68 operate under the same principles, with a 120V AC power and all electronics mounted internally (and as opposed to the crosswise extending rail support 44 (or DIN Rail).

A plurality of photo sensors, again such as eight for a rack as previously illustrated and described, as well as sixteen for a locker and which may be located internally for sensing the presence of the critical asset and which may again include such as stun gun, night vision goggle, breathalyzer device, radio, AED, handgun, etc.

Having provided a fairly detailed description of the hardware components associated with the ID station 10, racks 28 and lockers 68, an explanation will now be made of the associated user interface software protocol for operating the system and for enabling the operation of the various components and features of the system previously described. Referencing first FIG. 10, an illustration is shown at 70 of a first user interface step associated with the ID station and allowing a user to input a biometric parameter (fingerprint), such as into the scanner 18 previously described in reference to the ID station 10, and in order to initiate a weapon acquisition/release log-in sequence. According to this step, a user logs in biometrically to the system by placing their previously recorded finger (print) on the biometric reader mounted below the PC and, upon the light on the reader illuminating green such as sounding a long "beep" indicative of a good read. The occurrence of a light illuminating "red" can indicate such as a failed read, and which may be accompanied by no sound emanating from the ID station.

FIG. 11 illustrates a succeeding password entry screen 72, which will typically follow the initial biometric input step screen 70, and in order to provide an additional layer of user authentication. In particular, a system parameter highly recommends an initial biometric input, following which a backup password can be entered. This is also envisioned to help prevent instances in which the forcible application by others of an individual's fingerprint imprint can cause the system to authorize a weapon acquisition, and without the correct follow up password being inputted. The screen 72 also includes touch screen inputs 74 for entering a password, as well as at 76 for providing information regarding the biometric access control system.

Figure 12:
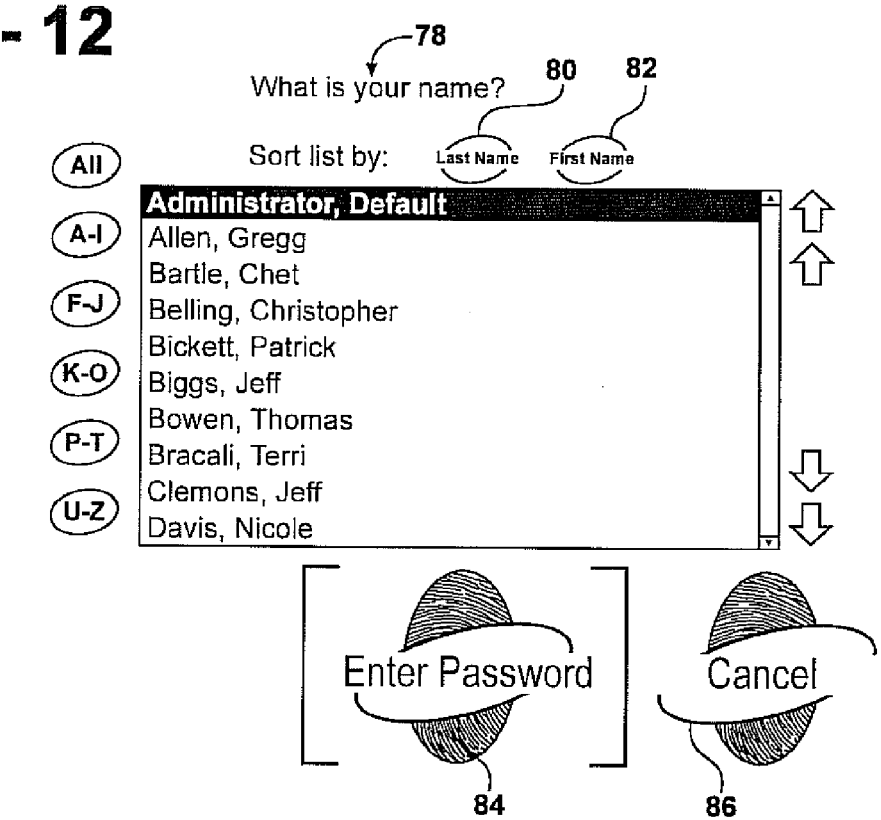
FIG. 12 is an illustration of an eligible user list/screen.

Referring to FIG. 12, an eligible user list/screen is shown at 78 and by which a user's name is selected from the list of previously enrolled and eligible individuals. Screen 78 includes touch entries for listing by last name 80, first name 82, for entering password 84 and for canceling an entry 86.

Figure 13:
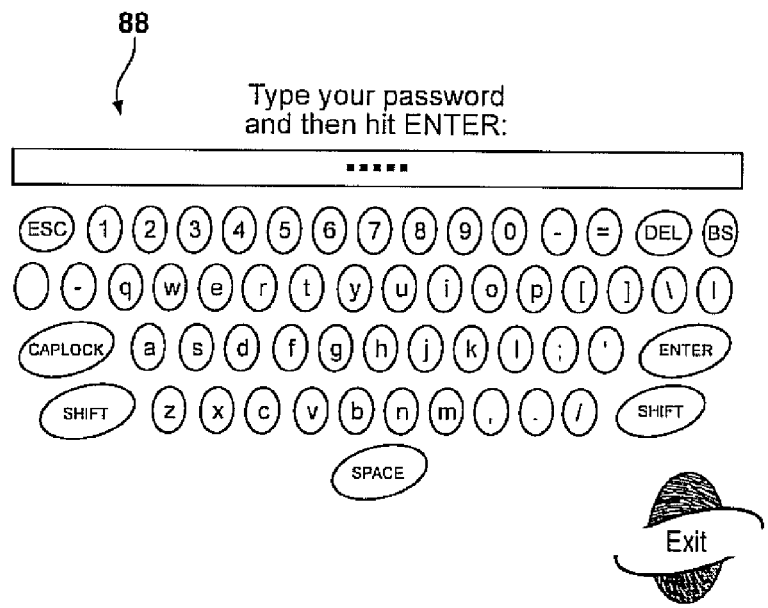
FIG. 13 is a user password entry screen.
Figure 14:
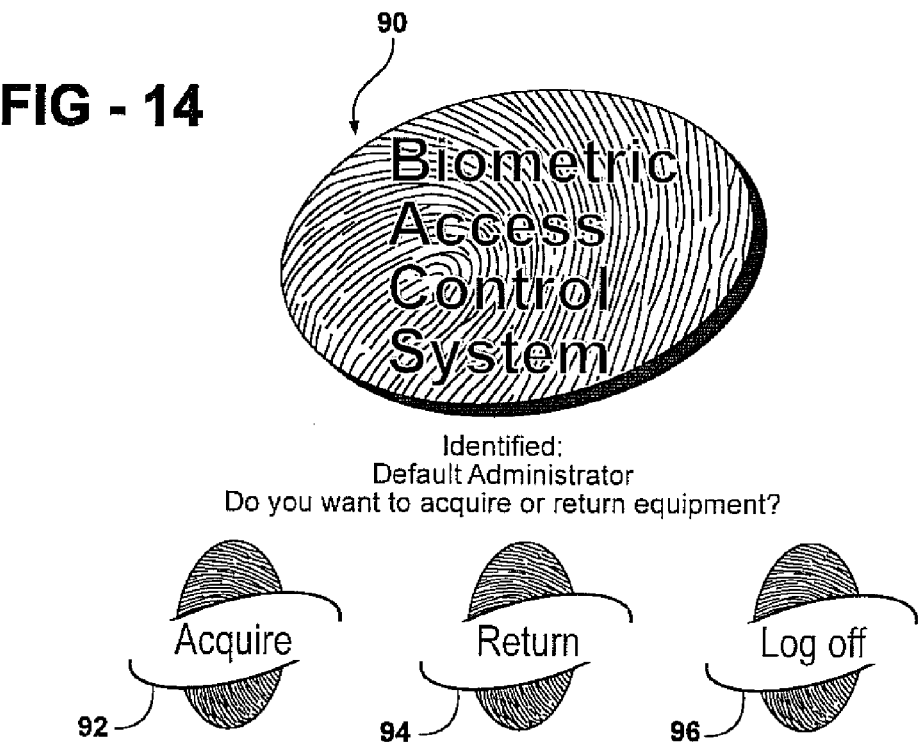
FIG. 14 is a succeeding desired action screen and illustrating asset acquisition, return or logoff options.

Progressing to 88 in FIG. 13, a user password entry screen is shown and which allows a user to type in their password, following which the enter key is depressed. FIG. 14 illustrates, at 90, a succeeding desired action screen for providing a user with the options of asset acquisition 92, asset return 94 or logoff 96 options.

Figure 15:
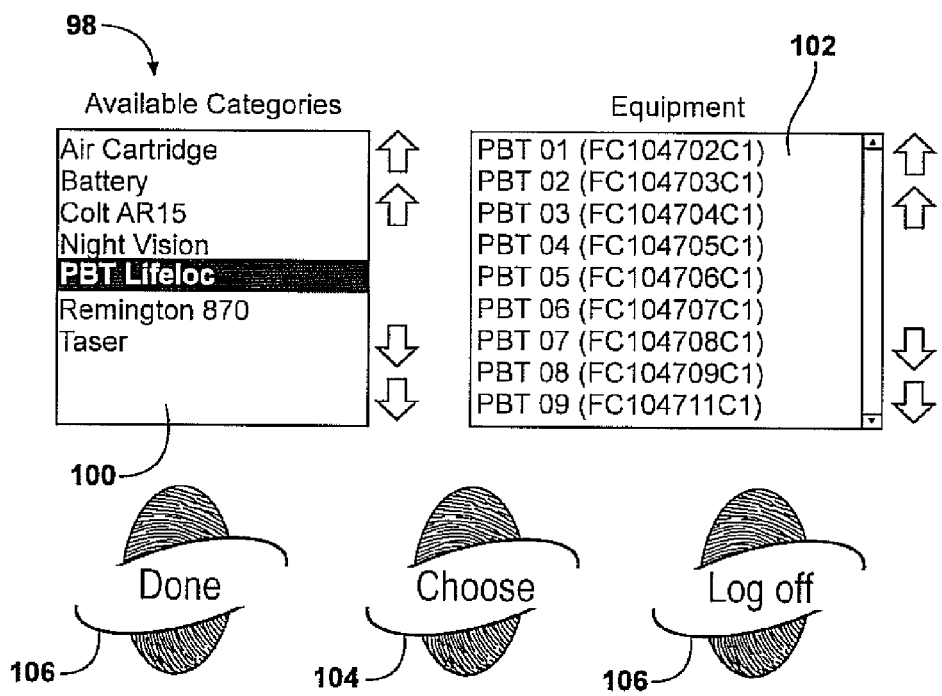
FIG. 15 is an equipment/weapon acquisition screen and for checking a selected piece of equipment out of the system.

FIG. 15 illustrates, at 98, an equipment/weapon acquisition screen for checking a selected piece of equipment out of the system. On this screen, a user will select a category of equipment 100 desired, it being noted that only categories with assigned privileges (i.e., weapons or critical assets rated for use by that individual) available to a user will be displayed. Once a category is selected, the user then selects a specific piece of equipment from a further scroll screen sub-portion 102.

Alternatively, and if the user is acquiring an item which is not locked into a rack or locker, a qualified/rated item can merely be presented to the RFID reader located on the ID station (see again at 20 in FIG. 1), the result being that the item, again if authorized for that individual, is automatically selected (and upon the ID station reading and recording the RFID tag/chip secured to the item). Once the equipment is selected, the user then proceeds to select the Choose touch screen location 104 in order to open an associated lock (see clamping locations 50, 52, 54 for rack 28 in FIG. 3) for the selected equipment item.

At that point, the user will be returned to the screen 98 once the item has been unlocked and unless the item is secured to a rack 28, at which the user will be automatically logged off upon the item of equipment being removed from the rack and the associated sensor instructing the system that the item has been removed. In the further instance of the desired item to be acquired is located in a locker 68 (or again not in locked storage) the user then selects the touch screen location done 106 (such as to return to the main screen for equipment return) or logoff 106 if finished. A recommended practice is for a user, who is acquiring multiple items, to first acquire those assets which are either unlocked or in a locker, and before acquiring additional rack assets, thus being prevented from being automatically logged off from the system on multiple occasions.

Figure 16:
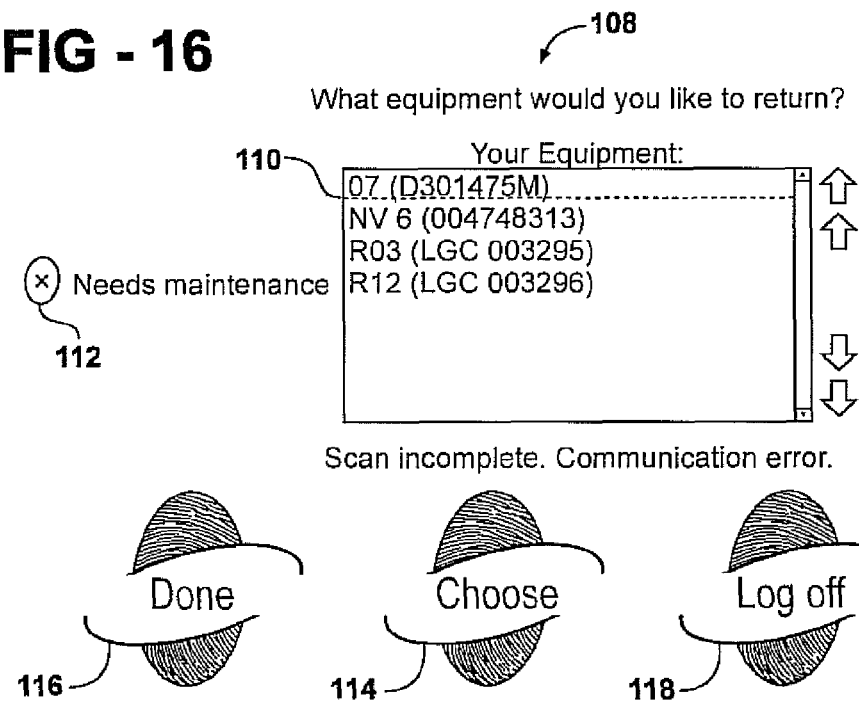
FIG. 16 is a succeeding equipment return screen for reentering into the system, the previously checked out piece of equipment.

Referring now to FIG. 16, a succeeding equipment return screen 108 is referenced for reentering, into the system, the previously checked out piece of equipment. On this screen, the user will see a list of all items listed as currently having been acquired by him/her, see at 110. Once a particular item is scanned, it will be automatically selected in (or added to) the equipment list. If the returned item requires service, the user will select the Needs maintenance check box 112, and in order to lock the item out from future acquisitions and until such time as a qualified and designated repair technician can serve the equipment. The user then presses Choose button 114 to unlock the storage location (and to permit replacement of the item). If the item is to be returned to a rack 28, the user will again be automatically logged off when the equipment is removed. Otherwise, and again if the item is from a locker or not in locked storage, the user will select Done 116 to return to the main screen or Logoff 118 if finished. Again, it is recommended that the user return both unlocked and locked retained assets prior to returning rack secured assets and in order to keep the user from having to login to the system multiple times.

Figure 17:
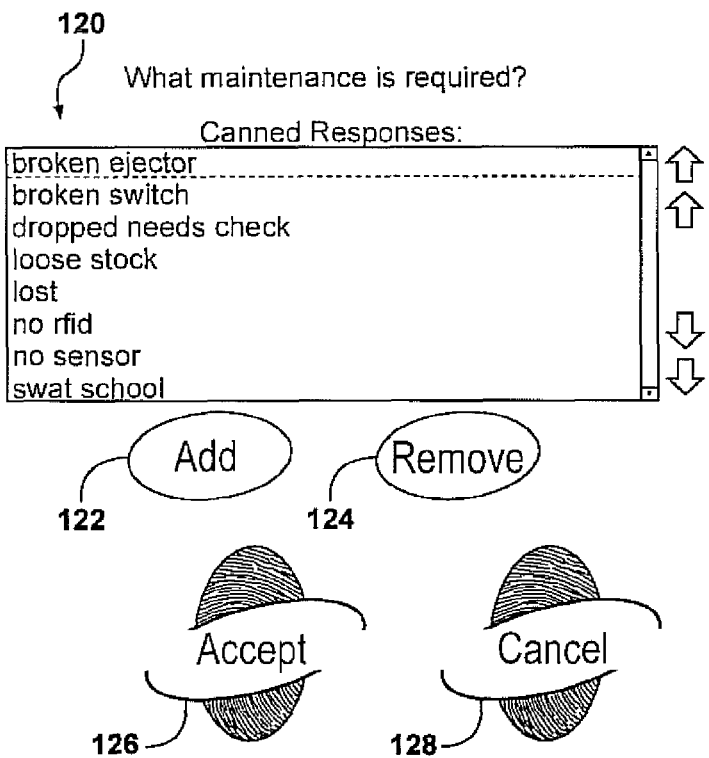
FIG. 17 is a maintenance request screen for noting and requesting servicing for a defect of such as a previously issued piece of equipment.

FIG. 17 illustrates at 120 a maintenance request screen for noting and requesting servicing for a defect of such as a previously issued piece of equipment. Typically, a number of canned responses are listed under this screen, one of which a user selects to designate the required maintenance for the designated item. If the user selects maintenance required, they are then prompted to either select a previously entered maintenance reason or to enter a new one. This ensures that the piece of equipment is properly flagged for the correct service requirement. Repetitively described touch screen locations are presented for adding 122 or removing 124 a maintenance request, and accepting 126 or canceling 128 the request.

Figure 18:
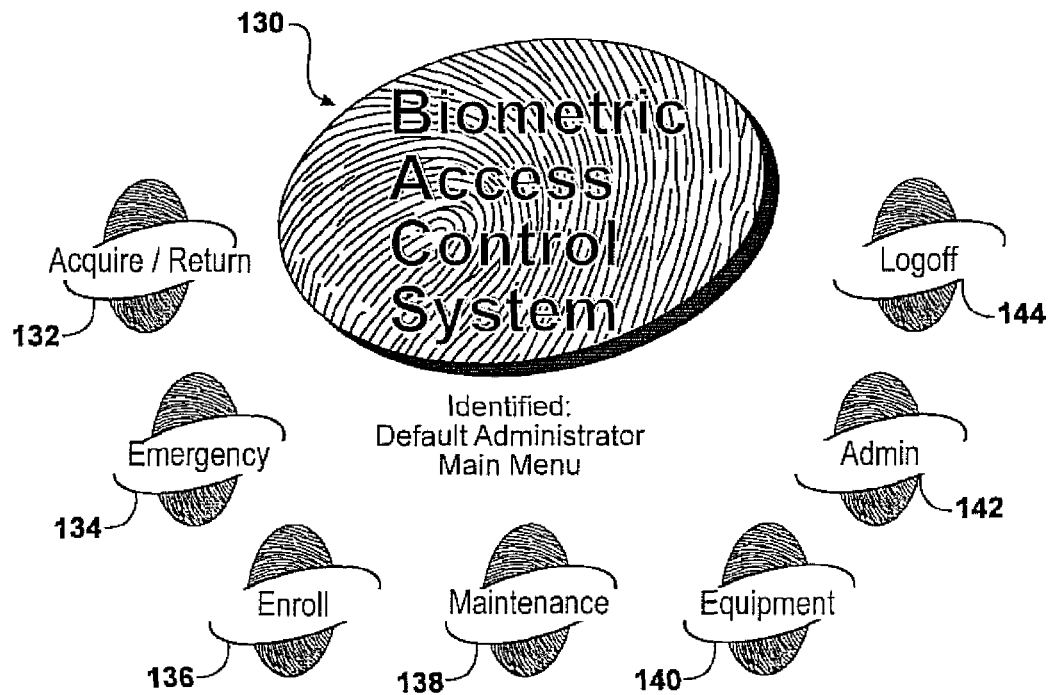
FIG. 18 is a first advanced level/administrative user interface screen and illustrating a number of options associated with the present system.

FIG. 18 illustrates a first advanced level/administrative user interface screen 130, this presenting a number of options associated with the present system for entering/inputting information, requesting printouts and the like, at an administrative level and as opposed to a general acquisition/return/maintenance request protocol associated with a previously registered user (such as a line officer). As previously described, a number of push button entries include those for acquiring/returning assets 132, emergency overrides 134, enrolling new users/administrators 136, maintenance related items 138, equipment catalogs 140, administrative options 142, and logoff 144.

Figure 19:
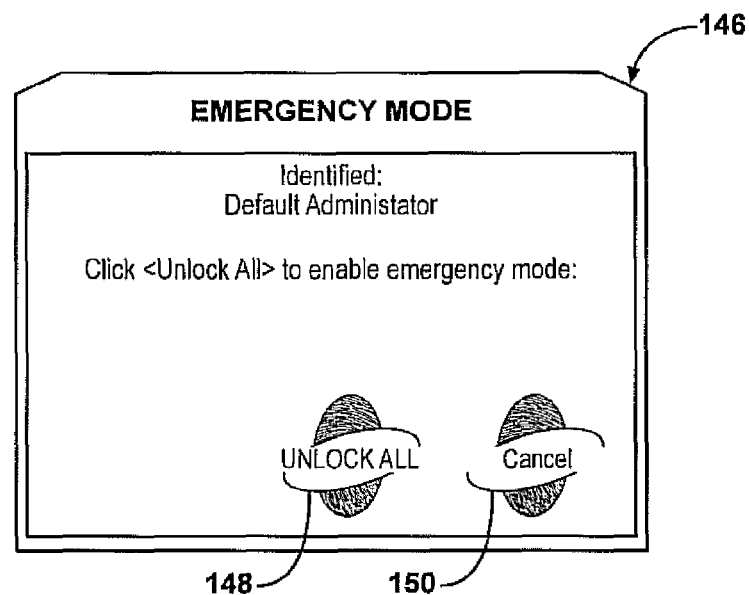
FIG. 19 is an emergency unlock screen and such as which can provide access to all items, except those flagged for maintenance.

FIG. 19 progressively illustrates, at 146, an emergency unlock screen and such as which can provide access to all items, except those flagged for maintenance. By selecting Unlock all option 148 a specifically qualified user (such as a command officer or other high ranking individual) can quickly unlock all of the locked equipment in the system (such as again items flagged for maintenance). This will cause all of the locker 68 doors to be opened (necessitating that all locker items be returned regardless of use) and the system can also unlock up to two racks 28 at a time (this only requiring the return of equipment which has actually been removed). Also, a cancel request option 150 is likewise presented.

Figure 20:
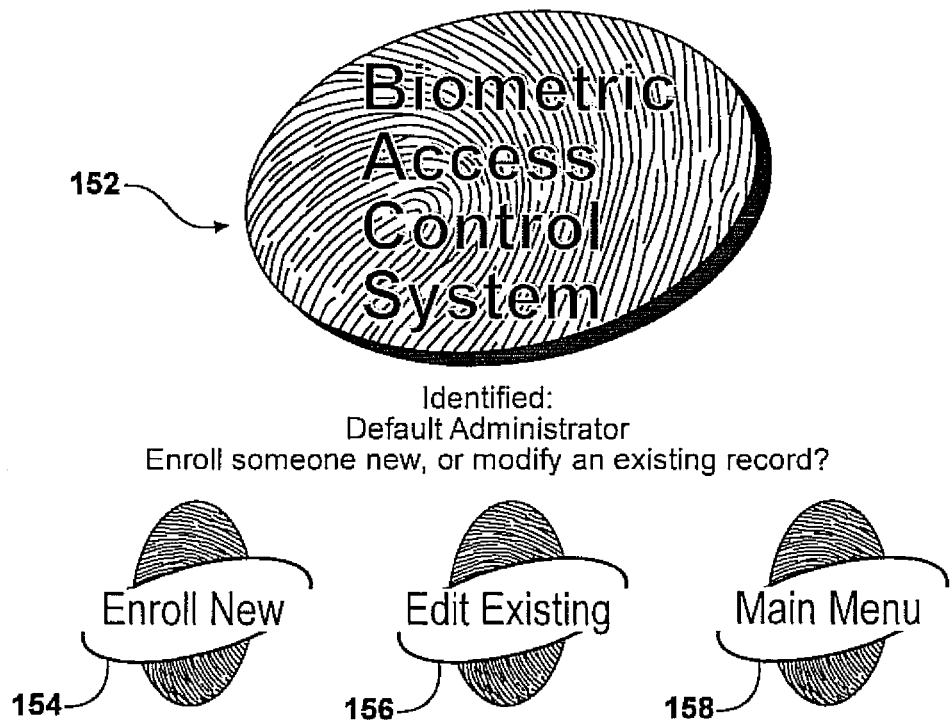
FIG. 20 is an advanced level user enrollment/edit screen and by which a designated user can add/edit/remove other users from the system.

FIG. 20 is an advanced level user enrollment/edit screen 152 and by which a designated user can add/edit/remove other users from the system. This function is primarily a quick method for adding users, with any significant addition of users typically being accomplished through additional remote interfacing screens. Illustrated are enroll new user 154, edit existing user 156 and main menu 158.

Figure 21:
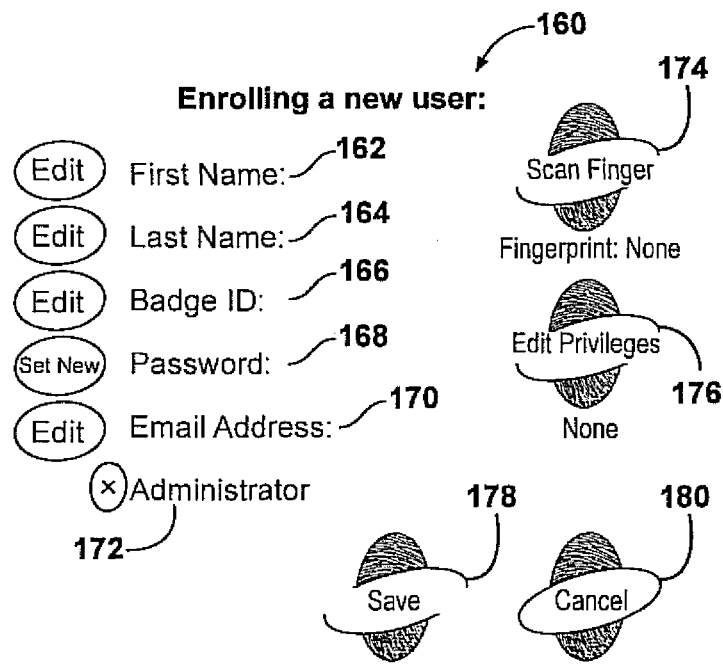
FIG. 21 is a new account enrollment screen for quickly adding new users to a system.

FIG. 21 is a new account enrollment screen 160 for quickly adding new users to a system. A user can create new accounts through this screen and which functions primarily as a quick method for adding users (such as new patrol/law enforcement officers). Any significant addition of users is typically accomplished through again the remote interface options associated with the present system. Enrollment touch screen entries include those for first name entry 162, last name 164, badge ID/number 166, password (typically assigned) 168, Email address 170, administrator 172, fingerprint scan 174, edit privileges 176 (i.e. qualifying weapon access), save 178 and cancel 180. A user also has the ability to edit an existing account through this screen, and which is identical to a new user screen except that all of the fields are filled out with the previous entries. In the event a new user is added through the remote interface, editing to add biometrics to the account usually occurs at this step.

Figure 22:
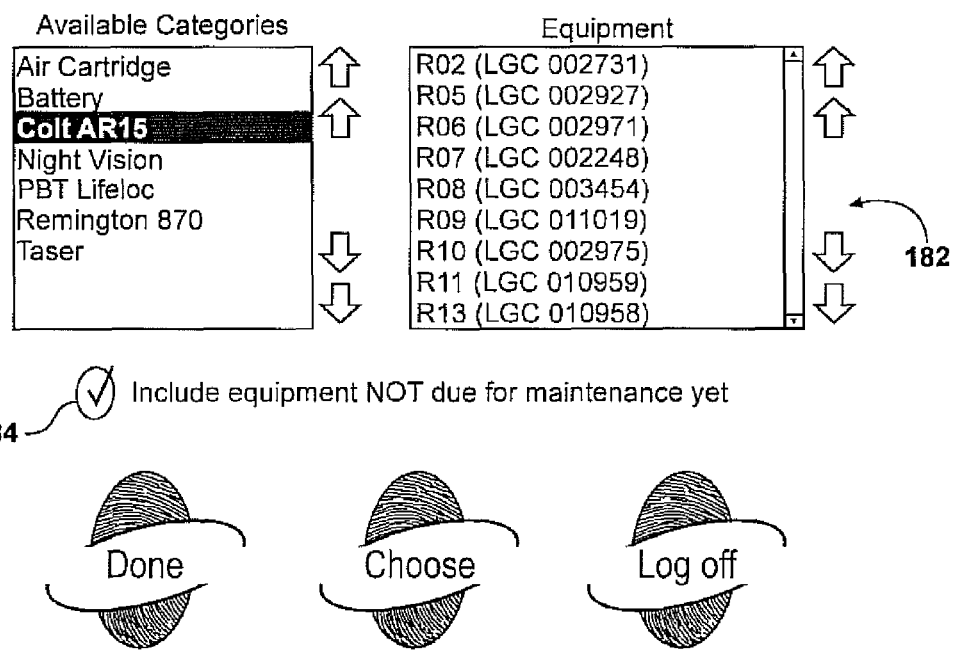
FIG. 22 is an equipment maintenance screen for selecting and checking out equipment for servicing.

FIG. 22 illustrates at 182 an equipment maintenance screen for selecting and checking out equipment for servicing and which allows a maintenance user to acquire any and all items that have been previously flagged for service. In the event that the maintenance user wants to acquire an item for maintenance that has not been previously flagged, all that is required is to select the checkbox on the screen to display all equipment in the system, see at 184. Otherwise, the acquisition process functions identically to the description provided on the Basic User interface "acquire" section, see FIG. 15. Upon the maintained equipment being later returned, after being acquired for maintenance, the maintenance user will be prompted at that point to enter the type of maintenance performed.

Figure 23:
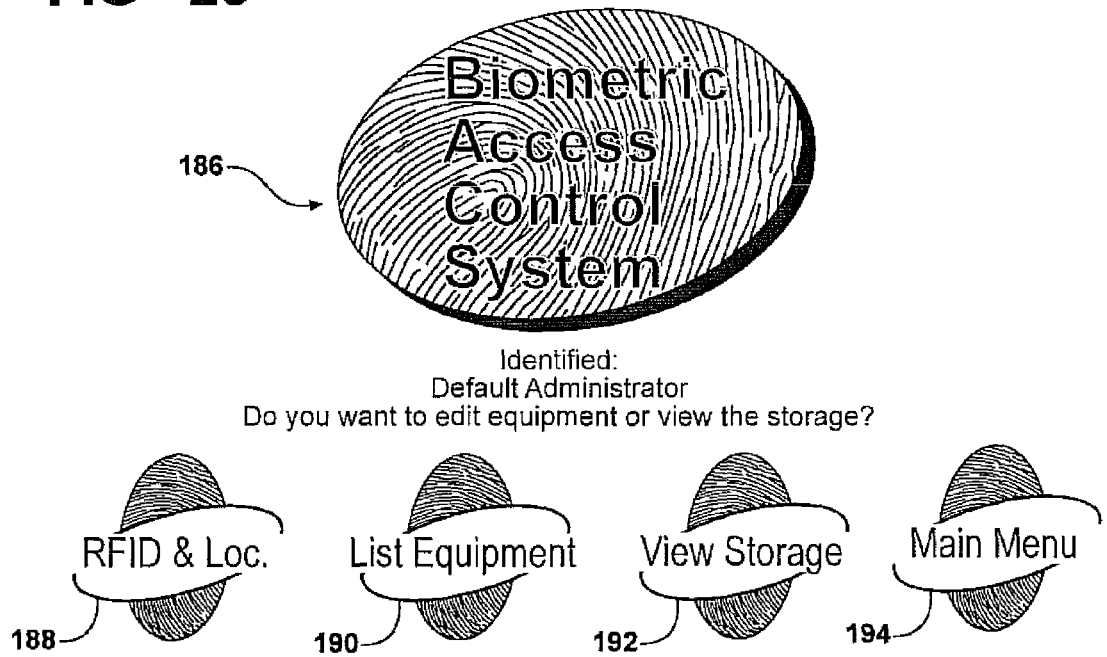
FIG. 23 is an equipment property edit screen through remote interface.

FIG. 23 illustrates at 186 an equipment property edit screen through remote interface. This screen allows a user to edit the equipment properties of items previously added through the remote interface (no equipment can be added at the kiosk), or to check the status of the equipment secured in the system. Touch screen locations include those for RFID & location 188, List Equipment 190, View Storage 192, and Main Menu 194.

Figure 25:
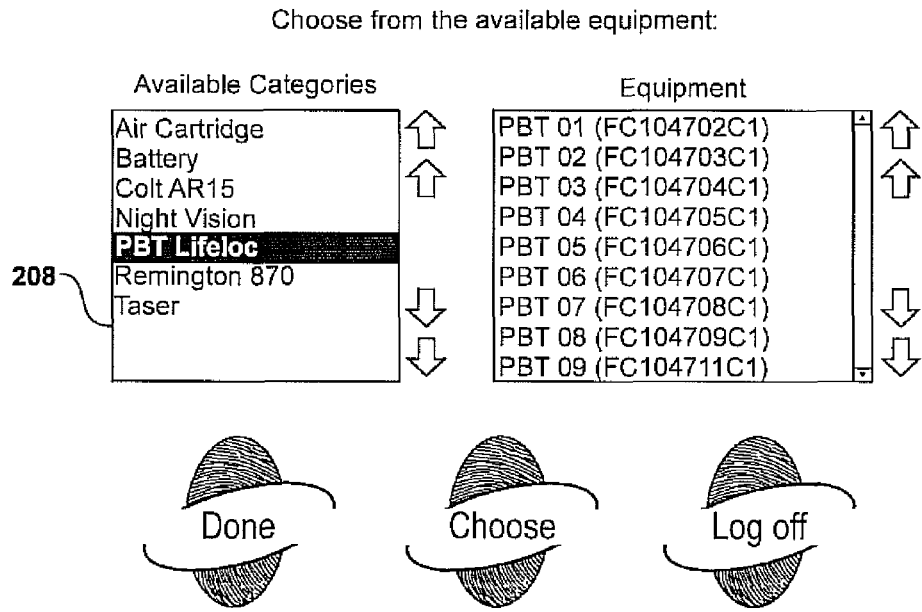
FIG. 25 is a choose from available equipment screen associated with the present system.

FIG. 24 is a screen illustration, at 196, of a radio frequency identification (RFID) tag for permitting a user to assign/clear/read an RFID tag located on the weapon to the system weapon record log. In particular, this screen allows a user to assign an RFID tag located on the weapon to the weapon record in the system, and to assign a storage location of the equipment (such as if flagged to locked storage). Also included is a set location function 198 and which allows a user to manually set the assigned "static" storage location of the currently selected equipment, or automatically set 200 the equipment to "dynamic" storage for a storage device assigned to its equipment category. A clear location function 202 allows a user to clear the current storage location type from the record, and which is typically done so that a new location type can be defined. The clear RFID function 204 allows a user to clear the currently stored RFID tag from the record. A read RFID tag function 206 will read a new RFID tag into the current equipment record. A choose equipment function screen 208, see FIG. 25, allows a user to choose an item from available equipment associated with the present system and is similar to that again shown in FIG. 15.

Figure 26:
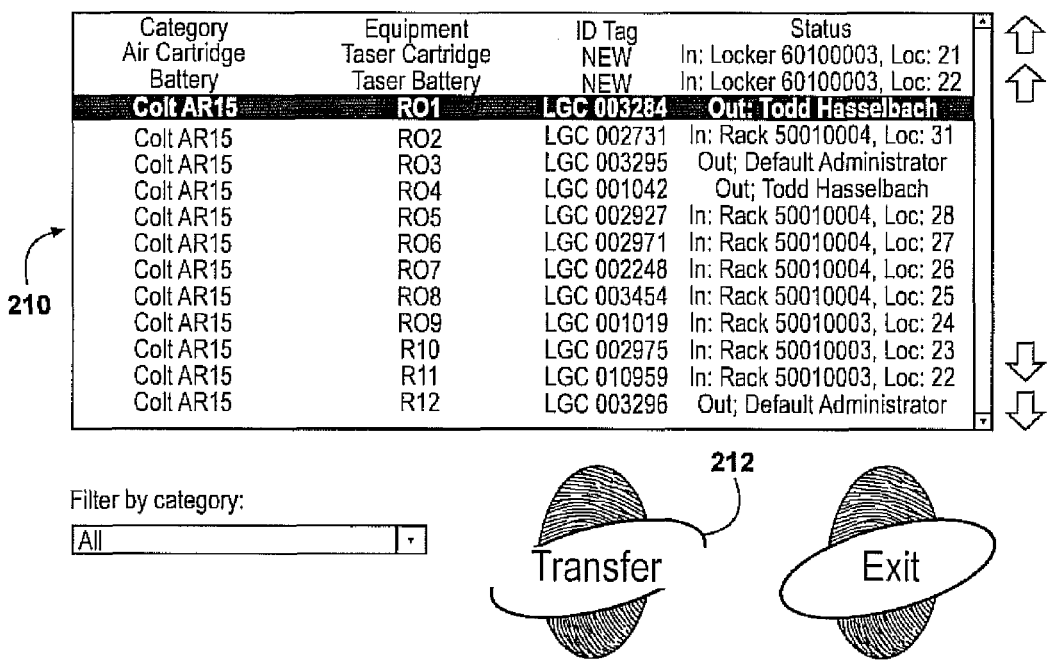
FIG. 26 is a list equipment status/transfer equipment screen for allowing a user to quickly view a current status of all equipment tracked by the system or to transfer responsibility from a previously checked out individual to the current user.

FIG. 26 illustrates at 210 a list equipment status/transfer equipment screen for allowing a user to quickly view a current status of all equipment tracked by the system or to transfer responsibility from a previously checked out individual to the current user. Included is a transfer sub-function 212 which will transfer the "checked out to" status of the selected equipment from the person who originally acquired it, to the current administrative user that is logged in.

Figure 27:
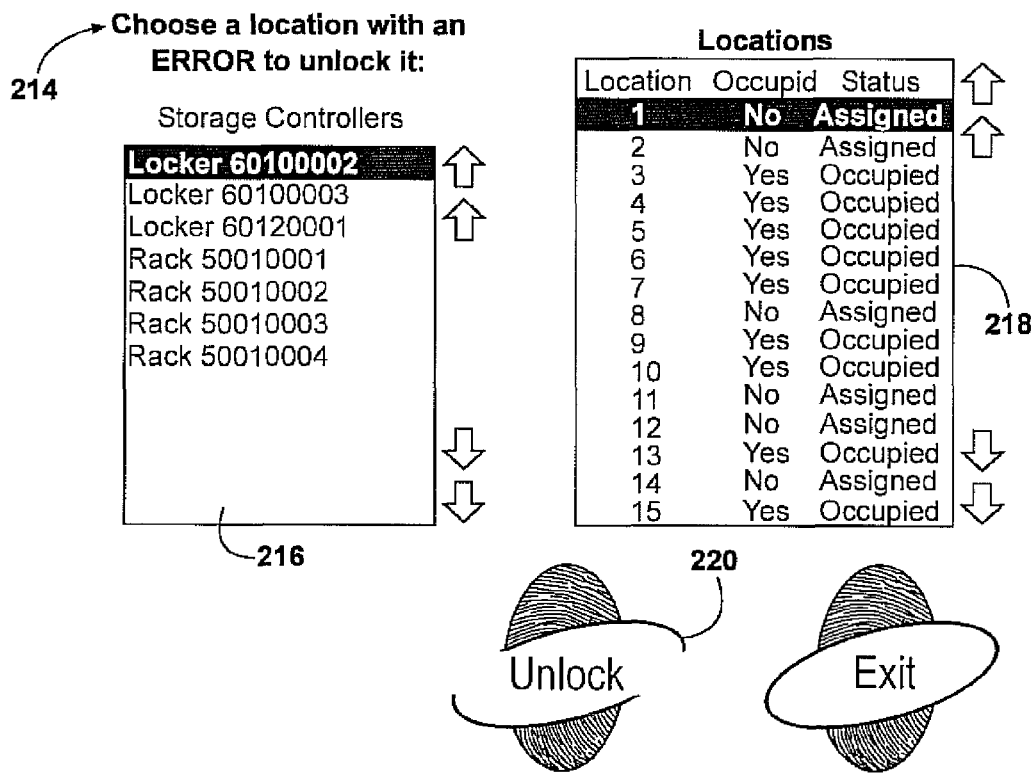
FIG. 27 is a view storage lock screen for verifying whether a selected item of equipment is secured in an appropriate rack/cabinet location.

FIG. 27 is a view storage lock screen 214 for verifying whether a selected item of equipment is secured in an appropriate rack/cabinet location. This screen allows a user to quickly view the status of each storage device's lock location (and whether equipment is assigned to that location and if the system thinks the equipment is currently located there). Reference is made to storage controllers sub screen 216, as well as location sub screen 218 indicating occupied (yes/no) for status (assigned/occupied). Unlock function 220 will electronically unlock the selected storage location, this button only being present in the instance of the selected location being thought to be empty, or if the location is known to be occupied but the system does not have an accurate record of what was last returned there.

Figure 28:
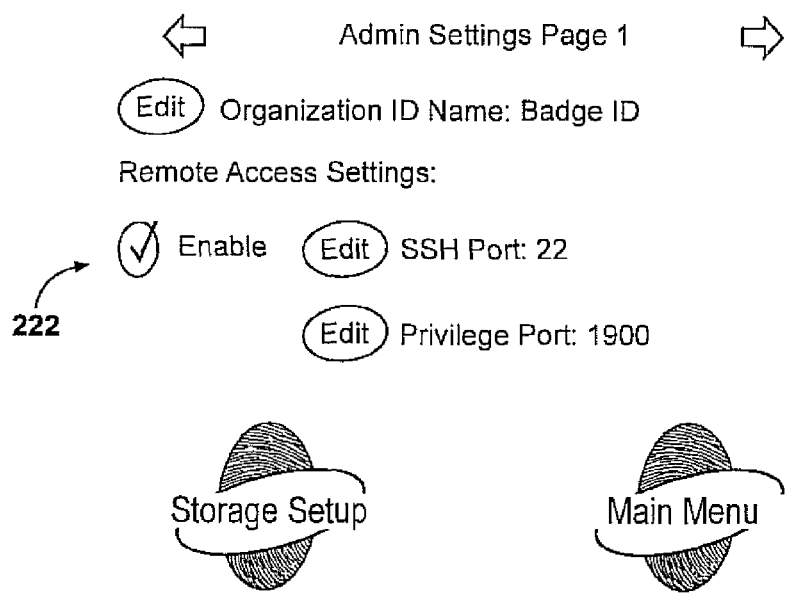
FIG. 28 is an administration settings screen allowing the editing of a description assigned to a selected user ID (badge) number.

FIG. 28 is an administration settings screen 222 allowing the editing of a description assigned to a selected user ID (badge) number or employee number. Also enabled is the editing of the security settings for the remote access software.

Figure 29:
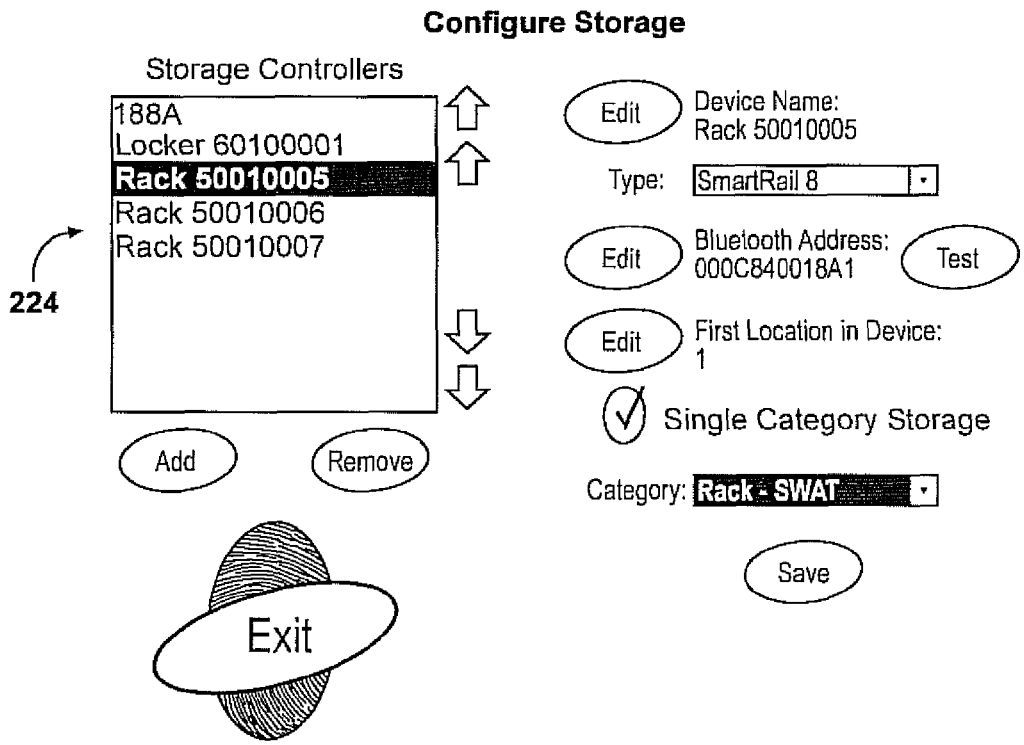
FIG. 29 is a storage/setup configuration screen allowing the editing/removal/addition of storage devices (i.e., additional racks or lockers) connected to the system.

FIG. 29 is storage/setup configuration screen 224 allowing the editing/removal/addition of storage devices (i.e., additional racks or lockers) connected to the system. These settings will be configured by authorized personnel, such as from the manufacturer or distributor, at the time the system is commissioned.

Figure 30:
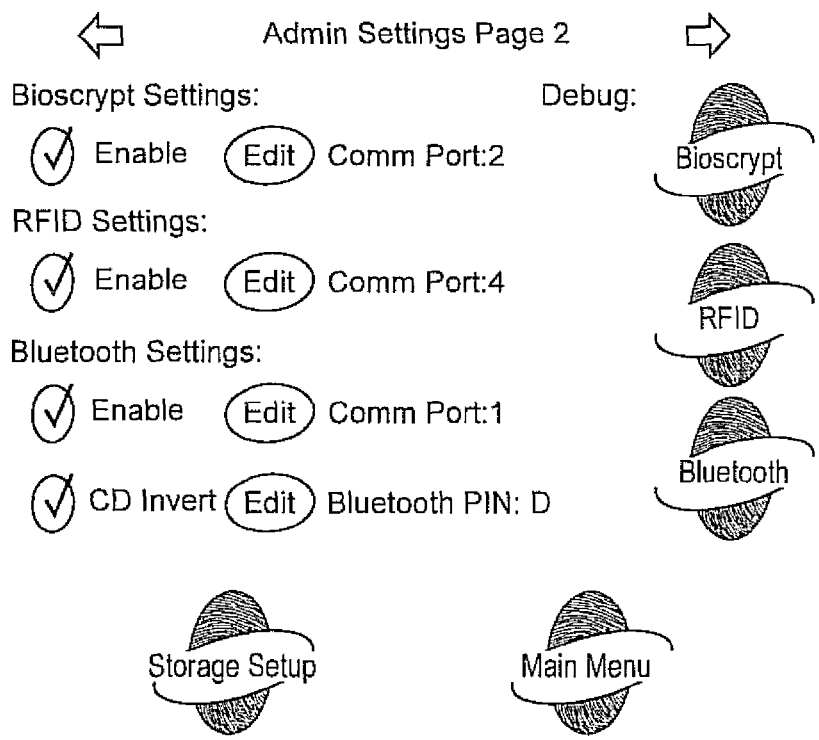
FIG. 30 is a screen for permitting editing of the communication settings associated with the biometric reader, RFID tag reader, and Bluetooth (wireless) antenna.
Figure 31:
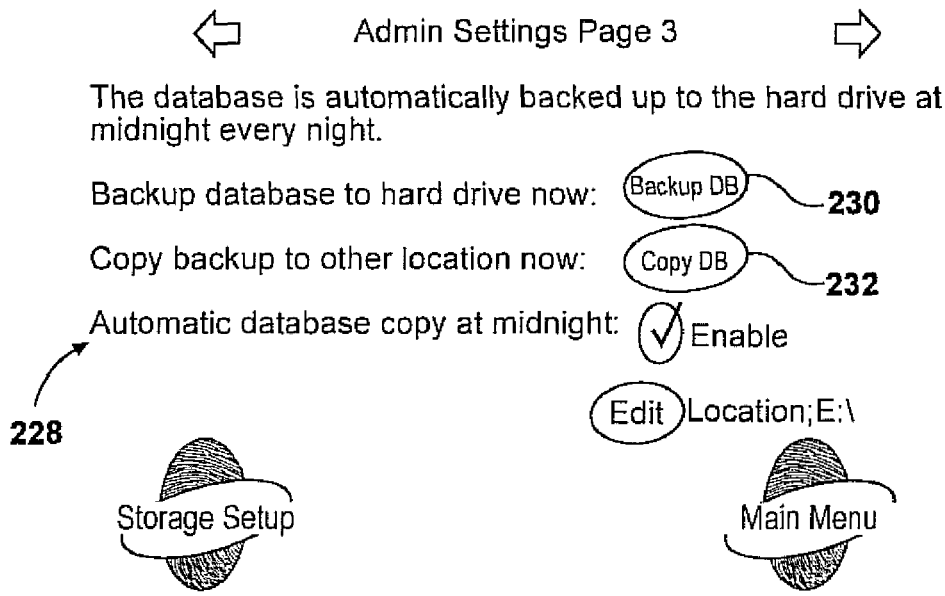
FIG. 31 is a successive administration settings screen and by which database backup is established for screen edits.

FIG. 30 is a screen 226 for permitting editing of the communication settings associated with the biometric reader, RFID tag reader, and Bluetooth (wireless) antenna. FIG. 31 is a successive administration settings screen 228, and by which database backup is established for screen edits, allowing for certain manual overrides. Typically, the system database is automatically backed up to the default backup location on the kiosk hard drive (ID station 10), such as every evening at 12:00 AM. The backup database function 230 allows the user to force an immediate backup, see at 232, of the database to the default backup location on the kiosk hard drive. Once the database is backed up to the default location, a copy of it can also be placed in another secure location, such as upon a server on the network that is regularly backed up by an IT administrator.

Figure 32:
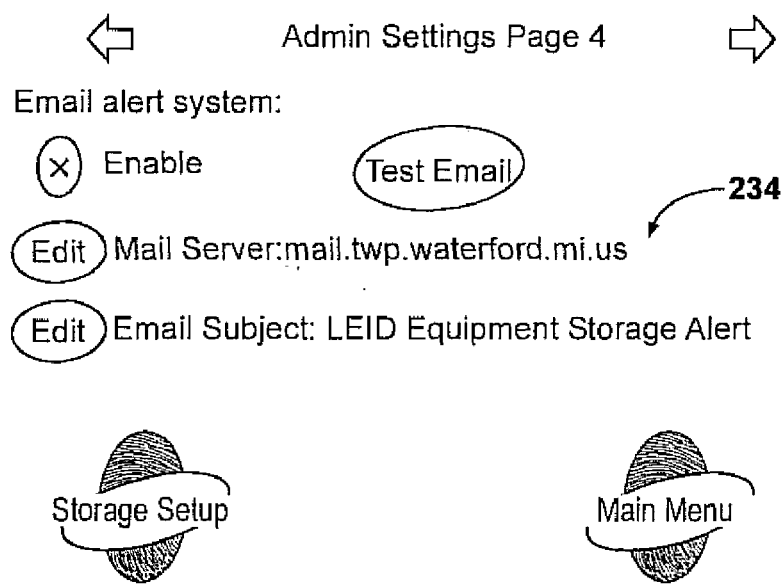
FIG. 32 is a yet further administration screen by which editing of settings is provided for e-mail notification for system anomalies, such as utilization of a bypass key for removing equipment.
Figure 33:
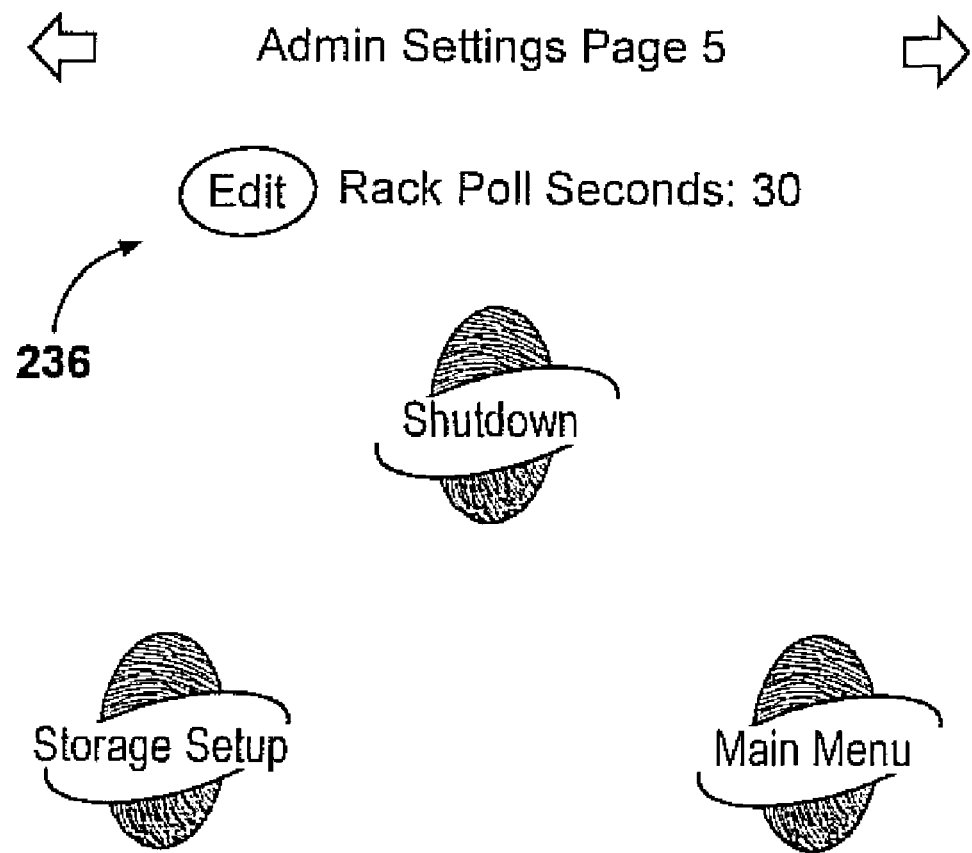
FIG. 33 is a final administration screen establishing editing options for polling (verifying) weapon presence at each rack/locker location, such as resulting from the use of a bypass key, and further allowing the designated administration users to shutdown the system for enabling access to the associated operating system's desktop.

FIG. 32 is a yet further administration screen 234, by which editing of settings is provided for e-mail notification for system anomalies, such as utilization of a bypass key for removing equipment. Finally, FIG. 33 is a final administration screen 236 establishing editing options for polling (verifying) weapon presence at each rack/locker location, such as resulting from the use of a bypass key, and further allowing the designated administration users to shutdown the system for enabling access to the associated operating system's desktop.

Although not illustrated, a remote access login application program can also be incorporated into the present system and computer writeable medium, this enabling a remote user connected by computer to access, in secure fashion, the biometric access control system. Such required functions include (at a minimum) a server host (IP address of the ID station you desire to connect to), a login/ID badge number, and any other fields which may be required to authenticate the user trying to obtain remote access.

To complete connection, a password may be required, following which a host of screens are presented, similar in scope to those referenced throughout FIGS. 18-33, these enabling a remote user (e.g. again such as a higher level administrative or command officer) to accomplish such as enrolling/removing/editing a user's entry field/privileges, equipment management/maintenance functions, as well as view activity/training logs and to allow for printout of the same.

In this manner, using the biometric access control system (BACS), a weapon/critical asset can only be checked out biometrically through the use of a finger print reader, thus ensuring that only a qualified/system rated individual has access to the weapon. Weapons are individually locked but still visible and continuously verified. Check in of weapons is accomplished by RFID tags (e.g. programmed chips whose unique ID is read by a magnetic field reader) located such as in the stock of the weapon, ensuring closed loop weapon tracking. Further weapon maintenance tracking and record keeping is provided for within the BACS database. An emergency mode of operation is also available for check out of all available weapons by a qualified officer. In this fashion, the BACS can also be used to control inventory of such other items as tasers, night vision goggles, portable breathalyzer devices, and the like and which can be kept in individual lockers also utilizing RFID technology and biometric access control.

In addition to the above disclosure, additional variants contemplate the incorporation of one or more video cameras for recording user actions, such as from the time of biometric log in until the point of automatic or user-selected system logout. An associated and pre-recorded video footage can also be listed in the transaction history report for the logged activity, and such as further can be included as a clickable web link for viewing on a web page. Additionally, and when fingerprints (or other biometric enter-able information) is added or edited, a quality score is given indicating the potential requirement for re-teaching poor quality of recorded fingerprint images.

The present disclosure therefore provides an efficient, automated and highly detailed/customizable processor based system for regulating weapon release, reentry and maintenance scheduling, and which is an improvement over existing manual procedures for handling weapon release, return and maintenance.

Other and additional preferred embodiments will become apparent to those skilled in the art to which it pertains, and without deviating from the scope of the appended claims. For example, a Bluetooth operated network slave device (smart padlock) can be provided for use with a standard locker of known design, the smart padlock may further be battery powered and can function in substitution for a standard medium sized padlock. The padlock can be monitored/controlled/actuated in the same fashion as generally referenced for the racks 28 and lockers 68 and may again be responsive to a keyed bypass or emergency release function.

The invention claimed is:
1. A biometric access control system, comprising:
an identification station, including:
a biometric reader to read biometric input from a user for recording the user's identity,
an identification reader to read an identification of a piece of equipment to be acquired or returned by the user,
a user interface to receive input from the user, including an indication to acquire or return the piece of equipment, and to display a plurality of categories of equipment authorized for use by the user, and to receive further input from the user including a selection of one of the equipment categories and a selection of a specific piece of equipment of the selected equipment category, and
a processor in communication with the biometric reader, identification reader, and the user interface; and
an equipment structure in communication with the identification station, and including:
a plurality of storage locations for storing a plurality of pieces of equipment assigned to the plurality of storage locations, and
a plurality of locks corresponding to the plurality of storage locations for individually securing the plurality of pieces of equipment to the structure,
wherein an authorization signal from the identification station is receivable to release a lock of the plurality of locks containing the selected specific piece of equipment to permit removal of the selected specific piece of equipment.

2. The system of claim 1, wherein the transaction log reports include video footage of user actions from user log in until logout.

3. The system of claim 1, wherein the locks include clamps.

4. The system of claim 1, wherein the user interface also displays the plurality of pieces of equipment from the selected equipment category.

5. The system of claim 1, wherein the biometric reader, identification reader, and processor cooperate to log user identification and equipment acquisitions and returns, and generate transaction log reports.

6. The system of claim 5, wherein the identification station also includes a remote access interface to allow remote user access to the transaction log reports.

7. The system of claim 1, wherein the user interface includes a touch screen, the biometric reader includes a fingerprint input module, and the identification reader includes a radio frequency identification (RFID) reader to read an RFID identifying tag incorporated into a location associated with the selected piece of equipment such that, upon presentation of the selected piece of equipment to the RFID reader, the processor logs the selected piece of equipment into the system.

8. The system of claim 1, wherein the equipment structure also includes a plurality of sensors aligned with the plurality of locks to indicate presence or absence of the pieces of equipment.

9. The system of claim 1, wherein the user interface also receives input from the user including an indication that a returned piece of equipment requires maintenance, a reason for the required maintenance, and the selection of the specific piece of equipment that is not locked out from acquisition because the specific piece of equipment has been indicated as requiring maintenance, and wherein the authorization signal from the identification station is receivable to release a lock of the plurality of locks containing the selected specific piece of equipment to permit removal of the selected specific piece of equipment that is authorized for the user and not locked out from acquisition as requiring maintenance.

10. The system of claim 9, wherein the identification station and equipment structure cooperate to provide an emergency override mode to permit access to all equipment not indicated as requiring maintenance.

11. The system of claim 9, wherein the biometric reader, identification reader, and processor cooperate to enable logging of equipment acquisitions and returns and provide a history of equipment maintenance and usage.

12. The system of claim 1, wherein the equipment structure is a weapon rack, the piece of equipment is a weapon, the plurality of categories of equipment is a plurality categories of weapons, the selection of one of the equipment categories is a selection of one of the weapons categories, and the specific piece of equipment is a specific weapon, the plurality of storage locations also includes a plurality of supporting pockets to secure the weapons, and the plurality of locks is a plurality of clamps to additionally secure the weapons to prevent weapon removal by disassembly.

13. The system of claim 1, wherein an authorization signal from the identification station is receivable by the equipment structure to release a clamp of the plurality of clamps containing the selected piece of equipment to permit removal of the selected piece of equipment, and wherein the pieces of equipment are individually locked and visible.

14. The system of claim 1, wherein the equipment structure also includes a plurality of lights to indicate lock open conditions.

15. The system of claim 1, wherein the user interface also receives input from the user including an indication to return the piece of equipment, and the user interface displays a list of equipment currently acquired by the user, and wherein the piece of equipment is scanned by the identification reader and automatically selected in the displayed equipment list.

16. The system of claim 1, wherein the user interface receives a choose equipment selection from the user to unlock a lock corresponding to a storage location for the selected specific piece of equipment to permit replacement thereof.

17. A biometric access control system, comprising:
  an identification station, including:
    a biometric reader to read biometric input from a user for recording the user's identity,
    an identification reader to read an identification of a piece of equipment to be returned or acquired by the user,
    a user interface to receive input from the user including an indication to return or acquire the piece of equipment, an indication that a returned piece of equipment requires maintenance, and a reason for the required maintenance, and to display a plurality of categories of equipment authorized for use by the user, and to receive further input from the user including a selection of an equipment category and a selection of a specific piece of equipment of the selected equipment category that is not locked out from acquisition because the specific piece of equipment has been indicated as requiring maintenance, and
    a processor in communication with the biometric reader, identification reader, and the user interface,
    wherein the biometric reader, identification reader, and processor cooperate to enable logging of equipment acquisitions and returns and provide a history of equipment maintenance and usage; and
  an equipment structure in communication with the identification station, and including:
    a plurality of storage locations for storing a plurality of pieces of equipment assigned to the plurality of storage locations, and
    a plurality of locks corresponding to the plurality of storage locations for individually securing the plurality of pieces of equipment to the structure,
    wherein an authorization signal from the identification station is receivable to release a lock of the plurality of locks containing the selected specific piece of equipment to permit removal of the selected specific piece of equipment that is authorized for the user and not locked out from acquisition as requiring maintenance.

18. The system of claim 17, wherein the identification station and equipment structure cooperate to provide an emergency override mode to permit access to all equipment not indicated as requiring maintenance.

19. The system of claim 17, wherein the biometric reader, identification reader, and processor cooperate to log user identification and equipment acquisitions and returns, and generate transaction log reports.

20. The system of claim 17, wherein the user interface includes a touch screen, the biometric reader includes a fingerprint input module, and the identification reader includes a radio frequency identification (RFID) reader to read an RFID identifying tag incorporated into a location associated with the selected piece of equipment such that, upon presentation of the selected piece of equipment to the RFID reader, the processor logs the asset into the system.

* * * * *